US006574632B2

(12) United States Patent
Fox et al.

(10) Patent No.: US 6,574,632 B2
(45) Date of Patent: *Jun. 3, 2003

(54) MULTIPLE ENGINE INFORMATION RETRIEVAL AND VISUALIZATION SYSTEM

(75) Inventors: Kevin L. Fox, Palm Bay, FL (US); Ophir Frieder, Chicago, IL (US); Margaret M. Knepper, Indialantic, FL (US); Robert A. Killam, Melbourne, FL (US); Joseph M. Nemethy, Melbourne, FL (US); Gregory J. Cusick, Melbourne Beach, FL (US); Eric J. Snowberg, Castle Rock, CO (US)

(73) Assignee: Harris Corporation, Melbourne, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,773

(22) Filed: Nov. 18, 1998

(65) Prior Publication Data

US 2003/0069873 A1 Apr. 10, 2003

(51) Int. Cl.$^7$ .......................... G06F 17/30; G06F 15/16

(52) U.S. Cl. .............................. 707/102; 707/5; 707/10; 709/218

(58) Field of Search .............................. 707/2, 3–6, 10, 707/100, 102, 513; 709/217–219, 203; 705/35–38; 345/764

(56) References Cited

U.S. PATENT DOCUMENTS

| 4,599,692 A | 7/1986 | Tan et al. ................... 364/513 |
| 5,062,143 A | 10/1991 | Schmitt ....................... 382/36 |

(List continued on next page.)

OTHER PUBLICATIONS

"Displaying Data in Multidimensional Relevance Space with 2D Visualization Maps," Assa et al., Proceedings of the 1997 Visualization Conference, Phoenix, Arizona, USA, ACM Press, pp. 127–134.*

(List continued on next page.)

Primary Examiner—Hosain T. Alam
(74) Attorney, Agent, or Firm—Allen, Dyer, Doppelt, Milbrath & Gilchrist, P.A.

(57) ABSTRACT

An information retrieval and visualization system utilizes multiple search engines for retrieving documents from a document database based upon user input queries. Search engines include an n-gram search engine and a vector space model search engine using a neural network training algorithm. Each search engine produces a common mathematical representation of each retrieved document. The retrieved documents are then combined and ranked. Mathematical representations for each respective document is mapped onto a display. Information displayed includes a three-dimensional display of keywords from the user input query. The three-dimensional visualization capability based upon the mathematical representation of information within the information retrieval and visualization system provides users with an intuitive understanding, with relevance feedback/query refinement techniques that can be better utilized, resulting in higher retrieval accuracy (precision).

27 Claims, 18 Drawing Sheets

U.S. PATENT DOCUMENTS

| | | | |
|---|---|---|---|
| 5,325,298 A | 6/1994 | Gallant | 364/419.19 |
| 5,649,193 A | 7/1997 | Sumita et al. | 395/614 |
| 5,675,819 A | 10/1997 | Schuetze | 395/760 |
| 5,696,962 A | 12/1997 | Kupiec | 395/604 |
| 5,706,497 A | 1/1998 | Takahashi et al. | 395/605 |
| 5,713,016 A | 1/1998 | Hill | 395/605 |
| 5,717,913 A | 2/1998 | Driscoll | 395/605 |
| 5,724,567 A | 3/1998 | Rose et al. | 395/602 |
| 5,724,571 A | 3/1998 | Woods | 395/605 |
| 5,745,893 A | 4/1998 | Hill et al. | 707/5 |
| 5,765,150 A | 6/1998 | Burrows | 707/5 |
| 5,774,888 A * | 6/1998 | Light | 707/1 |
| 5,835,905 A * | 11/1998 | Pirolli et al. | 707/102 |
| 5,987,446 A * | 11/1999 | Corey et al. | 707/3 |
| 6,026,397 A * | 2/2000 | Sheppard | 707/2 |
| 6,029,172 A * | 2/2000 | Jorna et al. | 707/102 |
| 6,038,561 A * | 3/2000 | Snyder et al. | 707/10 |
| 6,041,331 A * | 3/2000 | Weiner et al. | 707/103 R |
| 6,216,134 B1 * | 4/2001 | Heckerman et al. | 704/202 |
| 6,269,362 B1 * | 7/2001 | Broder et al. | 707/1 |

OTHER PUBLICATIONS

Shaw et al., *Combination of Multiple Searches*, Department of Computer Science, Virginia Tech., Blacksburg, Virginia, 4 pages Date Unknown.

Cavnar, *Using an N–Gram–Based Document Representation with a Vector Processing Retrieval Model*, Ann Arbor, Michigan, 9 pages Date Unknown.

* cited by examiner

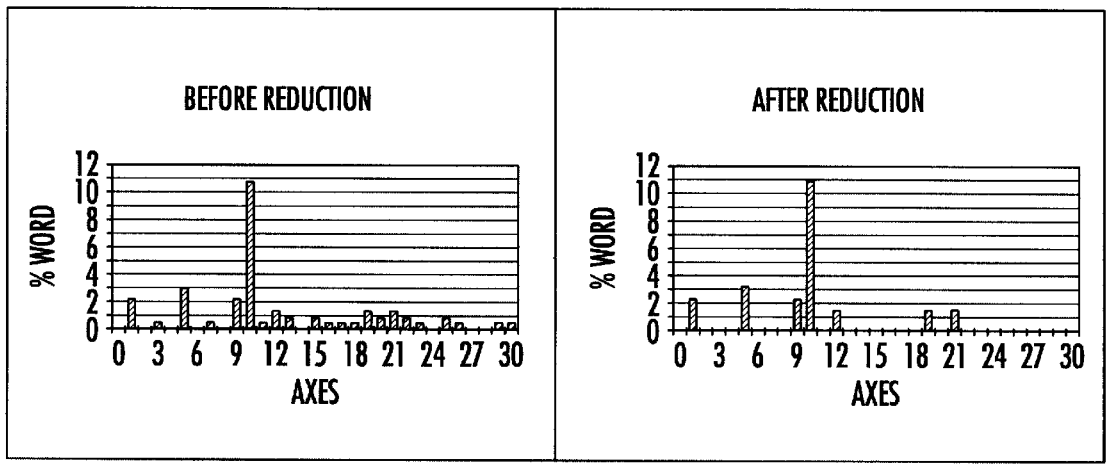

FIG. 3.

Rain, snow douse much of Nevada wildfire

Boys might not be charged with sparking blaze
June 25, 1996
  GENOA, Nevada (CNN) -- Firefighters gained ground Tuesday on a Nevada fire that has charred about 4,000 acres, gutted four homes and forced thousands of residents to flee near Lake Tahoe since Sunday. With fires in five other states, federal fire officals are calling this one of the worst starts to the annual wildfire season in recent memory.

"This is definitely one of the worst, and the season is only starting," said a spokesman for the National Interagency Fire Center in Boise, Idaho.

The Nevada fire was 70 percent contained as of midday and firefighters expected full containment by Wednesday morning.

Cameraman Mike Conway suffered burns after being trapped in the middle of the Nevada fire while filming. He jumped in the back of a pickup truck to escape the flames.

rain(35) snow(93) nevada(53) forest_fire(19) charge(35) spark(9) blaze(183) nevada(53) firefight(37) gain(21) nevada(53) fire(10) acre(41) house(95) resident(52) lake_tahoe(5) fire(10) fire(10) annual(52) forest_fire(19) season(1) season(1) national(53) fire(10) nevada(53) fire(10) contain(10) midday(49) firefight(37) containment(10) suffer(54) burn(139) middle(53) nevada(53) fire(10) film(139) escape(139)

FIG. 4.

MULTIPLE ENGINE INFORMATION RETRIEVAL AND VISUALIZATION SYSTEM

FIELD OF THE INVENTION

The present invention relates to the field of information retrieval systems, and, more particularly, to computer based information retrieval and visualization systems.

BACKGROUND OF THE INVENTION

The advent of the World-Wide-Web has increased the importance of information retrieval. Instead of visiting the local library to find information on a particular topic, a person can search the Web to find the desired information. Thus, the relative number of manual versus computer-assisted searches for information has shifted dramatically. This has increased the need for automated information retrieval for relatively large document collections.

Information retrieval systems search and retrieve data from a collection of documents in response to user input queries. Ever increasing volumes of data are rendering traditional information retrieval systems ineffective in production environments. As data volumes continue to grow, it becomes increasingly difficult to develop search engines that support search and retrieval with non-prohibitive search times. These larger data collections necessitate the need to formulate accurate queries, as well as the need to intuitively present the results to the user to increase retrieval efficiency of the desired information.

Currently, users retrieve distributed information from the Web via the use of search engines. Many search engines exist, such as, for example, Excite, Infoseek, Yahaoo, Alta Vista, Sony Search Engine and Lycos. Private document collections may also be searched using these search engines. A common goal of each search engine is to yield a highly accurate set of results to satisfy the information desired. Two accuracy measures often used to evaluate information retrieval systems are recall and precision. Recall is the ratio of the number of the relevant documents retrieved from the total number of relevant documents available collection-wide. Precision is the ratio of the number of relevant documents retrieved from the total number of documents retrieved. In many interactive applications, however, users require only a few highly relevant documents to form a general assessment of the topic, as opposed to detailed knowledge obtained by reading many related documents.

Time constraints and interest level typically limit the user to reviewing the top documents before determining if the results of a query are accurate and satisfactory. In such cases, retrieval times and precision accuracy are at a premium, with recall potentially being less important. A recent user study conducted by Excite Corporation demonstrated that less than five percent of the users looked beyond the first screen of documents returned in response to their queries. Other studies conducted on a wide range of operational environments have shown that the average number of terms provided by the user as an input query are often less than two and rarely greater than four. Therefore, high precision with efficient search times may typically be more critical than high recall.

In spite of the respective strengths for each of the various search engines, there is no one best search engine for all applications. Accordingly, results from multiple search engines or from multiple runs have been combined to yield better overall results. By combining the results of multiple search engines, an information retrieval system is able to capitalize on the advantages of a search engine with the intention of masking the weaknesses of the other search engine. A discussion of combining the results of an individual search engine using different fusion rules is disclosed, for example, by Kantor in *Information Retrieval Techniques*, volume 29, chapter 2, pages 53–90 (1994). However, the article discloses that it is not simple to obtain better results using multiple engines as compared to only a single search engine.

An article by Cavnar, titled "Using an N-Gram Based Document Representation with a Vector Processing Retrieval Model," discloses the use of a n-gram technology and a vector space model in a single information retrieval system. The two search retrieval techniques are combined such that the vector processing model is used for documents and queries, and the n-gram frequencies are used as the basis for the vector element values instead of the traditional term frequencies. The information retrieval system disclosed by Cavnar is a hybrid between an n-gram search engine and a vector space model search engine.

In an article by Shaw and Fox, titled "Combination of Multiple Searches," a method of combining the results from various divergent search schemes and document collections is disclosed. In particular, the results from vector and P-norm queries were considered in estimating the similarity for each document in an individual collection. P-norm extends boolean queries and natural language vector queries. The results for each collection are merged to create a single final set of documents to be presented to the user. By summing the similarity values obtained, the article describes better overall accuracy than using a single similarity value.

Once the information has been retrieved, user understanding of the information is critical. As previously stated, time constraints and interest level limit the user to reviewing the top documents before determining if the results of a query are accurate and satisfactory. Therefore, presentation of the retrieved information in an easily recognizable manner to the user is important. For example, presenting data to the user in a multi-dimensional format is disclosed in the patent U.S. Pat. No. 5,649,193 to Sumita et al. Detection results are presented in a multi-dimensional display format by setting the viewpoints to axes. The detection command is an origin and using distances of the detected documents with respect to the origin for each viewpoint as coordinates, the detected documents with respect to each axis are displayed.

Despite the continuing development of search engines and result visualization techniques, there is still a need to quickly and efficiently search large document collections and present the results in a meaningful manner to the user.

SUMMARY OF THE INVENTION

In view of the foregoing background, it is therefore an object of the present invention to provide an information retrieval and visualization system and related method for efficiently retrieving documents from a document database and for visually displaying the searh results in a format readily comprehended and meaningful to the user.

These and other objects, features and advantages in accordance with the present invention are provided by an information retrieval system for selectively retrieving documents from a document database using multiple search engines and a three-dimensional visualization approach. More particularly, the system comprises an input interface for accepting at least one user search query, and a plurality of search engines for retrieving documents from the document database based upon at least one user search query. Each of the search engines advantageously produces a common mathematical representation of each retrieved document. The system further comprises a display and visualization display means for mapping respective mathematical representations of the retrieved documents onto the display.

At least one search engine produces a document context vector representation and an axis context vector representation of each retrieved document. The document context vector representation is the sum of all the words in a document after reducing low content words, and is used to compare documents and queries. The axis context vector representation is a sum of the words in each axis after reducing low content words, and is used for building a query for a document cluster. The axis context vector is also used by the visualization means to map onto the display.

The present invention thereby provides a three-dimensional display of keywords, for example, from the user input query via the visualization display means. Displaying documents in a three-dimensional space enables a user to see document clusters, the relationships of documents to each other, and also aids in new document identification. Documents near identified relevant documents can be easily reviewed for topic relevance. Advantageously, the user is able to manipulate the dimensional view via the input interface to gain new views of document relationships. Changing the documents dimensionality allows the information to be viewed for different aspects of the topics to aid in further identification of relevant documents.

The plurality of search engines may comprise an n-gram search engine and a vector space model (VSM) search engine. The n-gram search engine comprises n-gram training means for least frequency training of the training documents. Similarly, the VSM search engine comprises VSM training means for processing training documents and further comprises a neural network.

The present invention provides precision in retrieving documents from a document database by providing users with multiple input interaction modes, and fusing results obtained from multiple information retrieval search engines, each supporting a different retrieval strategy, and by supporting relevance feedback mechanisms. The multiple engine information retrieval and visualization system allows users to build and tailor a query as they further define the topic of interest, moving from a generic search to specific topic areas through query inputs. Users can increase or decrease the system precision, effecting the number of documents that are retrieved as relevant. The weights on the retrieval engines can be modified to favor different engines based on the query types.

A method aspect of the invention is for selectively retrieving documents from a document database using an information retrieval system comprising a plurality of search engines. The method preferably comprises the steps of generating at least one user search query and retrieving documents from the document database based upon the user search query. Each search engine searches the document database and produces a common mathematical representation of each retrieved document. The respective mathematical representations of the retrieved documents are mapped onto a display. The method further preferably comprises the steps of producing a document context vector representation of each retrieved document, and producing an axis context vector representation of each retrieved document. The step of mapping preferably comprises the step of mapping the axis context vector representations of the retrieved documents onto the display.

Another method aspect of the invention is for selectively retrieving documents from a document database. The method preferably comprises the steps of defining a dictionary, randomly assigning a context vector to each word in the dictionary, training the dictionary words, assigning axis representation to each dictionary word, receiving at least one user search query, and searching a document database based upon the user search query. The dictionary comprises a plurality of words related to a topic to be searched. Advantageously, each dictionary word is assigned a context vector representation. These context vector representations are then used to create context vectors for representation of any document in a collection of documents, and for representation of any search query. If more documents are added to the collection, document representations do not have to be recalculated because a context vector representation of a document is not dependent on term frequency across the entire document collection.

In particular, training the dictionary words comprises the steps of receiving a training document, creating context vectors for each word in the training document, and converging the context vectors toward each other for the context vectors representing words appearing close to one another based upon contextual usage. Assigning axis representation comprises the step of assigning each dictionary word to an axis having the largest component. The method further preferably comprises the steps of displaying a mathematical representation of the retrieved documents from the document database corresponding to the search query.

BRIEF DESCRIPTION OF THE DRAWINGS

FIG. 2b is a graph of a distribution of the words through the first thirty axis for the example illustrated in FIG. 2a.

FIG. 3 are comparative graphs illustrating a percentage of words in the first thirty axis before and after document reduction according to the present invention.

FIG. 4 is a sample display of a document being reduced according to the present invention.

FIG. 12b is a display screen showing spheres drawn around the keywords as shown in FIG. 12a.

FIG. 13 is a display screen showing the clustering of documents retrieved as in FIG. 12a.

FIG. 14a is a display screen showing zooming in on the word "trial" with the text turned on as shown in FIG. 12a.

FIG. 14b is a display screen showing different aspects of the retrieved document set as shown in FIG. 12a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
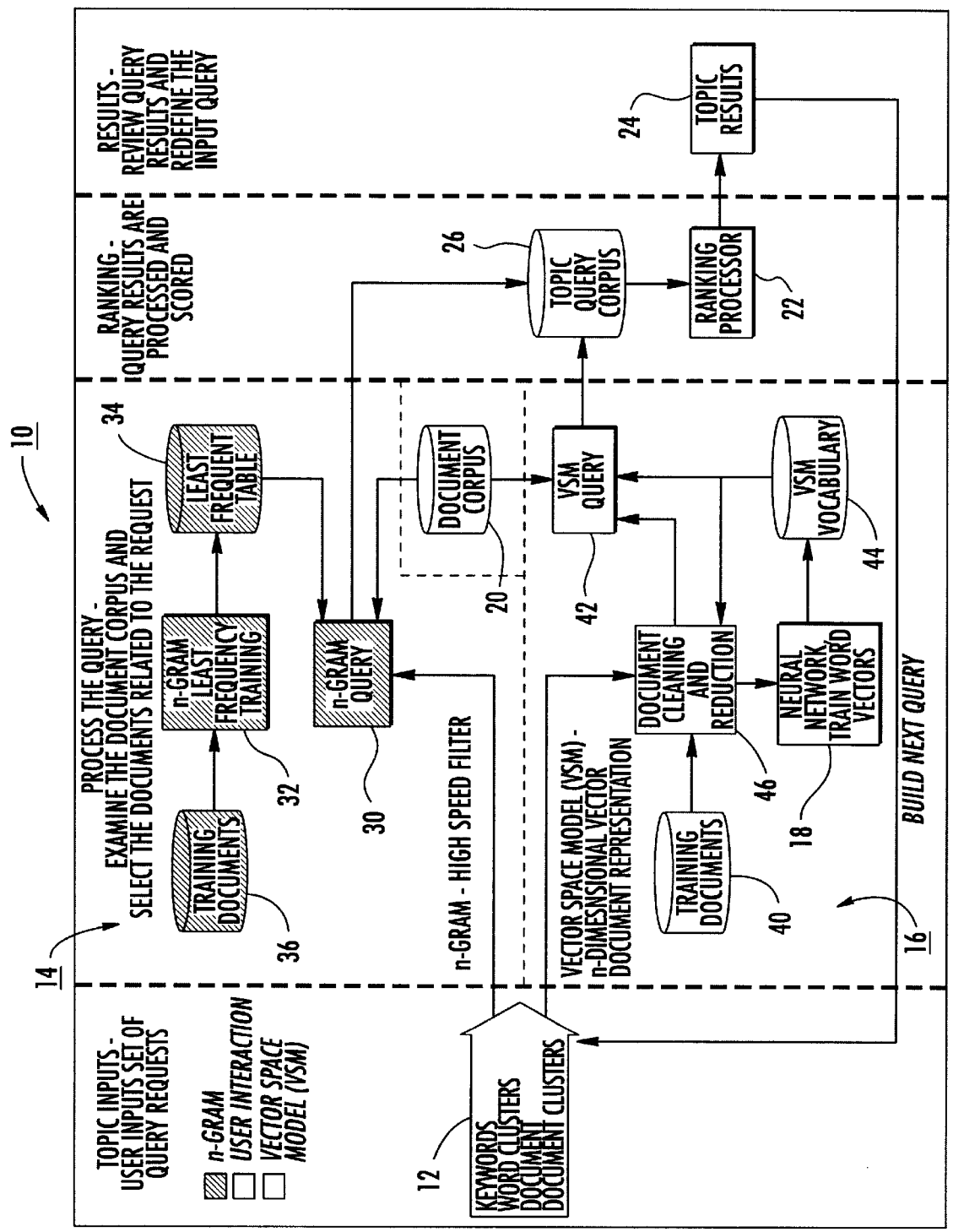
FIG. 1 is a block diagram of the information retrieval and visualization system according to the present invention.

Referring initially to FIG. 1 the system architecture of a multiple engine information retrieval and visualization system 10 according to the present invention is now described. For convenience, the multiple engine information retrieval and visualization system 10 will be referred to as the retrieval system 10. The retrieval system 10 selectively retrieves documents from a document database. System features and benefits are listed in Table 1 for the retrieval system 10.

TABLE 1

System Features

| FEATURES | BENEFITS |
| --- | --- |
| Fusion of multiple retrieval engines | Improved retrieval performance over independent search engines |
| An architecture that supports the addition of new search engines | Flexible search strategies |
| Search by keyword or document example | Tailored queries |
| Multiple query capability for a topic | Emphasize best search engine and queries for a topic |
| Document reduction | Improved performance and smaller document footprint |
| Partitioning of document corpus based on similarity | Reduces search space |
| Search screening | Remove topical but irrelevant documents |
| Manual Relevance Feedback | Query refinement |
| Web-based user interface | Familiar style facilitates quick review of retrieved documents and selection of example documents for use as additional queries |
| 3-D Visualization of retrieved document sets | Facilitates intuitive identification of additional relevant documents |

The retrieval system 10 includes an input interface 12 for accepting at least one user interface query. The input interface 12 also allows users to build queries for a topic of interest, execute the queries, examine retrieved documents, and build additional or refine existing queries. A plurality of search engines are used for retrieving documents from the document database based upon the user search query, wherein each search query produces a common mathematical representation of each retrieved document. The plurality of search engines include n-gram search engine 14, a Vector Space Model (VSM) search engine 16 which, in turn, includes a neural network training portion 18 to query a document corpus 20 to retrieve relevant documents. Results of the retrieval engines 14, 16 are fused together and ranked.

In one embodiment, the fusing together and ranking of the retrieved documents is performed by a ranking portion 22 of the computer system. The retrieval system 10 further comprises visualization display means 24 for mapping respective mathematical representations of the retrieved documents onto a display. The visualization display means 24 allow users to explore various aspects of the retrieved documents, and look for additional relevant documents by redefining the topic query corpus 26 via the input interface 12.

As previously discussed in the background section, information retrieval is the dissemination of information in response to user input queries. The information to be retrieved is typically stored in documents of various forms. Query formats range from a single set of words or phrases, to a Boolean logical expression that combines sets of words and phrases, to a complete natural language sentence or paragraph. A full document may also be used as an input query. A user begins by defining a topic of interest, then proceeds to define one or more queries for that topic. User queries for the retrieval system 10 can thus take the form of keywords or phrases, an example document, and even document clusters.

The retrieval system 10 utilizes an interactive multi-pass approach. It is not assumed that the information will be found immediately, and thus the user needs to interactively refine the search query. The retrieval system 10 allows the user to review the documents and select the documents most relevant to the topic. Relevant documents can be used as queries to further refine the topic. The user can then quickly query over the data with the additional queries.

By combining multiple separate and independent retrieval technologies, the various strengths of each approach can be leveraged to develop a more robust information retrieval system. The retrieval system 10 illustrated in FIG. 1 uses an n-gram search engine 14 and a vector space model (VSM) 16 search engine. These two search engines represent an embodiment of the present invention, and one skilled in the art will readily realize that other search engines can be used in place of, or in addition to, the n-gram 14 and the VSM 16 search engines. Other search engines that can be incorporated into the retrieval system 10 include, but are not limited to those using the following retrieval strategies: probabilistic retrieval, inference networks, boolean indexing, latent semantic indexing, genetic algorithms and fuzzy set retrieval. All of these retrieval strategies, including n-gram 14 and VSM 16, are well known to one skilled in the art. For illustrative purposes, a comparison of the strengths and weaknesses of the n-gram 14 and the VSM 16 search engines are provided in Table 2.

TABLE 2

Retrieval Engine Strengths and Weaknesses

| | n-gram | VSM |
| --- | --- | --- |
| Strength | unique terms (e.g. proper nouns) mis-spelled words short documents (e.g. e-mail) | example documents used as input document meaning |

TABLE 2-continued

Retrieval Engine Strengths and Weaknesses

| | n-gram | VSM |
|---|---|---|
| Weakness | long documents | unique terms (e.g. proper nouns - terms that did not appear in the training corpus and hence do not appear in the VSM's dictionary) |

With an n-gram search engine 14, an input query is partitioned into n-grams to form an n-gram query 30. An n-gram is a consecutive sequence of n characters, with n being a positive integer. The premise of an n-gram search engine 14 is to separate terms into word fragments of size n, then design algorithms that use these fragments to determine whether or not a match exists. For example, the first 15 tri-grams (3-grams) in the phrase "information retrieval" are listed below:

| inf | orm | ati | on_ | ret |
| nfo | rma | tio | n_r | etr |
| for | mat | ion | _re | tri |

The frequency of occurrence of n-grams can be used to distinguish/characterize the language of a document (3-grams), and as a means of gauging the topical similarity of documents (5-grams). The retrieval system 10 employs an n-gram filter based on work with Least Frequent Tri-grams (LFT), as represented in FIG. 1 by the n-grams least frequency training block 32. The retrieval system 10 moves an n-character sliding window over a document while recording the frequency of occurrence of different combinations of n-characters. A least frequency table 34 is built from a corpus of training documents 36, representative of the document collection. Relevant documents are rapidly identified by looking for the occurrence in the document of the least-frequent n-gram of a search string, such as a keyword. If the least frequently occurring n-gram of a search term is not present in a document, then the term itself is not in the document. If the least frequently occurring n-gram is present, the search continues for the entire string.

In one embodiment of the retrieval system 10, a 3-character sliding window (3-grams) is used. For illustrative purposes, a tri-gram frequency analysis is performed on a representative sample of documents. From this analysis, a table of tri-gram probabilities is developed for assigning an occurrence probability p(t) to each of the unique tri-grams. The occurrence probability is expressed as:

$$p(t) = \frac{\text{number documents which tri-gram occurred}}{\text{total number of documents analyzed}}$$

The developed table is used to determine the LFT for any given query, and the frequencies were not evenly distributed throughout the tri-grams. When the documents used to train against are written in English, certain tri-grams (TER, ING, THE) occur very frequently, while others (JXF, DBP, GGG) occur only under highly unusual circumstances.

The n-gram retrieval search engine 14 counts the number of occurrences of the string. Since typical early searches are keywords, the n-gram search engine 14 acts as a filter to quickly identify candidate documents to be reviewed early in the retrieval process. It is especially useful for phrases not in the dictionary/vocabulary 44 of the VSM search engine 16. The identified relevant documents are then used on the next pass through the retrieval system 10. Additionally, if the keyword phrase of interest is unique enough, the documents containing the keyword phrase are used to create a document subset. Further queries are performed on just the document subset, which increases the search speed.

The retrieval system 10 also comprises a Vector Space Model (VSM) search engine 16 to represent documents in an n-dimensional vector space. The strengths and weaknesses of the VSM 16 are listed above in Table 2. In particular, a context vector model is implemented for the retrieval system 10. Words appearing in the document training corpus 40 are represented as vectors in the n-dimensional vector space, $\omega \in \Re^n$. The word vectors, $\omega \in \Re^n$, are normalized to unit length so that they all lie on the unit hyper-sphere and $$\sum_{v_i} \omega_i^2 = 1$$

The similarity of two words is measured by computing the cosine similarity measure of the associated vectors, $\omega, v \in \Re^n$.

$$\frac{\langle \omega, v \rangle}{\|\omega\|_2 \|v\|_2} = \frac{(\omega \cdot v)}{|\omega||v|}$$

This similarity measure is the cosine of the angle between the two vectors. The higher the value of the cosine angle(i.e., closer to +1), the smaller the angle between the two vectors. Since all of the word vectors are on the unit hyper-sphere, $\|\epsilon\|_2 = \|\epsilon\| = 1$ for all $\omega$, the cosine similarity measure reduces to $$\frac{\langle \omega, v \rangle}{\|\omega\|_2 \|v\|_2} = \frac{(\omega \cdot v)}{(1)(1)} = \omega \cdot v = \sum_{v_i} \omega_i v_i$$

A vector for each document, $\omega \in \Re^n$, is constructed based on the terms in a document. A query is considered to be like a document, so a document and a query can be compared by comparing their respective vectors in the vector space. Documents whose content, as measured by the terms in the document, correspond most closely to the content of the query are judged to be the most relevant. The documents are retrieved through keyword, word clusters (series of words), and example document queries mapped into the n-dimensional vector space. The documents whose respective vectors are a minimal distance from the query's vector are retrieved.

Many Vector Space Models count the frequency of occurrence of words and phrases to build the document queries 42. Frequency counts are done on the individual document files and for the document corpus 20. As new data are entered, the frequency counts must be updated or recomputed. Queries 42 are built upon the highest frequency counts for documents, necessitating more computation time. The retrieval system 10 creates an entirely mathematical representation of a document, and builds queries 42 from that representation. The mathematical representation allows consistent grouping of the words so that they can be compared.

Using only a mathematical representation offers several advantages. One advantage is that additional documents can be added to the document corpus 20 without having to recalculate word occurrence frequencies. Other advantages include reduced documents, small vectors, a small index, and minimal calculations are required to build positive and negative queries, i.e., no document recalculation is required. Also, document size independence and similarity equations are simplified.

Keywords, keyword phrases, single documents, and document clusters are provided as input to the retrieval system's 10 VSM component as queries. Queries 42 constructed by the VSM 16 can be broadly or narrowly focused, depending on the keywords, phrases, and example documents used in the queries. The document's score is obtained by computing the distance between the vectors representing the query and the document. Scores for relevant documents typically range from approximately 0.45 to 1. The closer to 1, the better the document matches the search query.

Experiments have shown that the VSM's 16 strongest performance results from the use of example documents and document clusters. As passes are completed, top query results are reviewed and identified as relevant or irrelevant. Relevant documents from the query are input to the next pass of the VSM search engine 16.

A neural network (NN) training portion 18 is used within the retrieval system 10 to train the word vectors, $\omega \in \Re^n$, in the VSM search engine 16. The NN training algorithm 18 is based on the training rule for Kohonen's Self-Organizing Map. This unsupervised learning algorithm organizes a high-dimensional vector space based on features within the training data so that items with similar usage are clustered together. Heavier weights are placed on words in closer proximity. The neural network 18 also accounts for training that has already taken place by adjusting the lesser trained words. The training algorithm is described as follows:

1. Initialize context vectors for each word in the dictionary. The values in the vector are chosen at random, and
2. For N training epochs
3. For each training document
   a) Set word_index to 0
   b) Set neighbor_word_index to word_index +1
   c) Adjust context vector for word(word_index) and word(neighbor_word_index). This accounts for proximity of words in the document, weighting more heavily words that are closer in proximity. This also accounts for training that has already taken place by adjusting highly trained words less. The algorithm is given as
      i) $d = w_1 - w_2$, where $w_1$=context vector for word (word_index), and $w_2$=context vector for word (neighbor_word_index)
      ii) $w_1(k+1) = w_1(k) - \mu_w k_1 d$, where $\lambda_w$=learning rate for word neighbor adjustments, and $k_1 = (w1\_num\_updates*(neighbor\_word\_index-word\_index))^{-1}$
      iii) $w_2(K+1) = w_2(k) + \mu_w k_2 d$ where $k_2 = (w2\_num\_updates*neighbor\_word\_index-word\_index))^-$
      iv) Renormalize $w_1$ and $w_2$
   d) if (neighbor_word_index-word_index)<max_neighbor_words
      i) Increment neighbor_word_index
      ii) Go to 3c, else if not done with all words in document
      iii) Increment word_index
      iv) Go to 3b
   e) Calculate context vector for document
   f) For every word in the document, adjust the word's context vector so that it is closer to the document's context vector. This steers words and the document that contains them towards a cluster of similar meaning in the vector space.
      i) $d = w - v$, where w is the context vector for the word, and v is the context vector for the entire document
      ii) $w(k+1) = w(k) - \mu_d d$ where $\mu_d$ is the learning rate for word-to-document adjustment ($\mu_d << \mu_w$)
      iii) Renormalize w
      iv) Note that early in the training, $\mu_w k_i$ should be much larger than $\mu_d$, since the document's context vector is very random until some word training has been done. Eventually, $\mu_d$ may dominate $\mu_w k_i$ since $k_i$ shrinks rapidly as word training continues.
4. Get next document and go to 3
5. Finish training epoch
   a) Increment epoch_count
   b) Reduce $\mu_w$. This ensures that as training nears completion, updates are small even for words that have not been trained much.
   c) If this is not the last epoch, go to 2, else done.

Figure 2B:
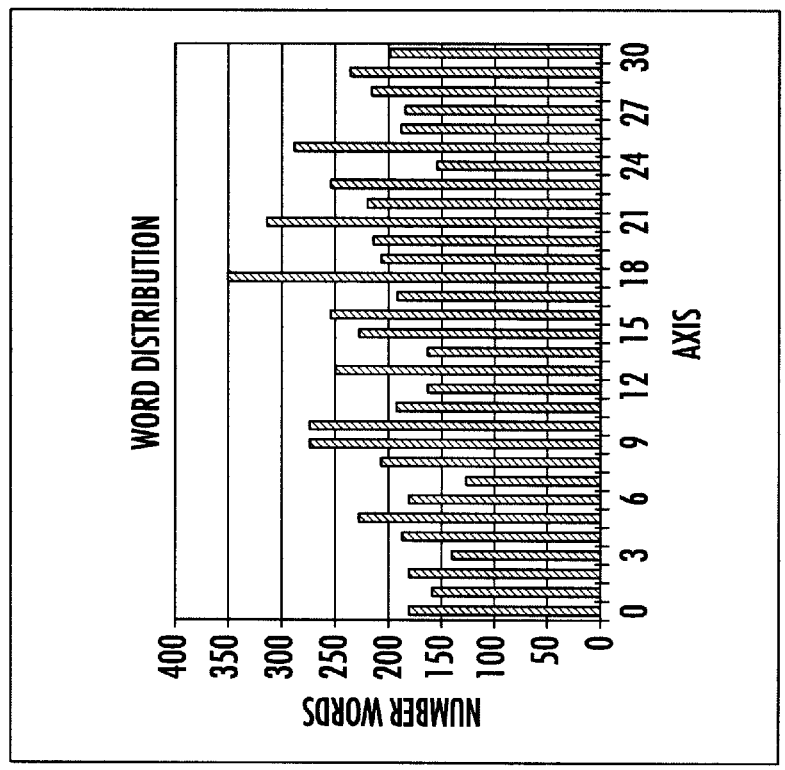
Figure 2A:
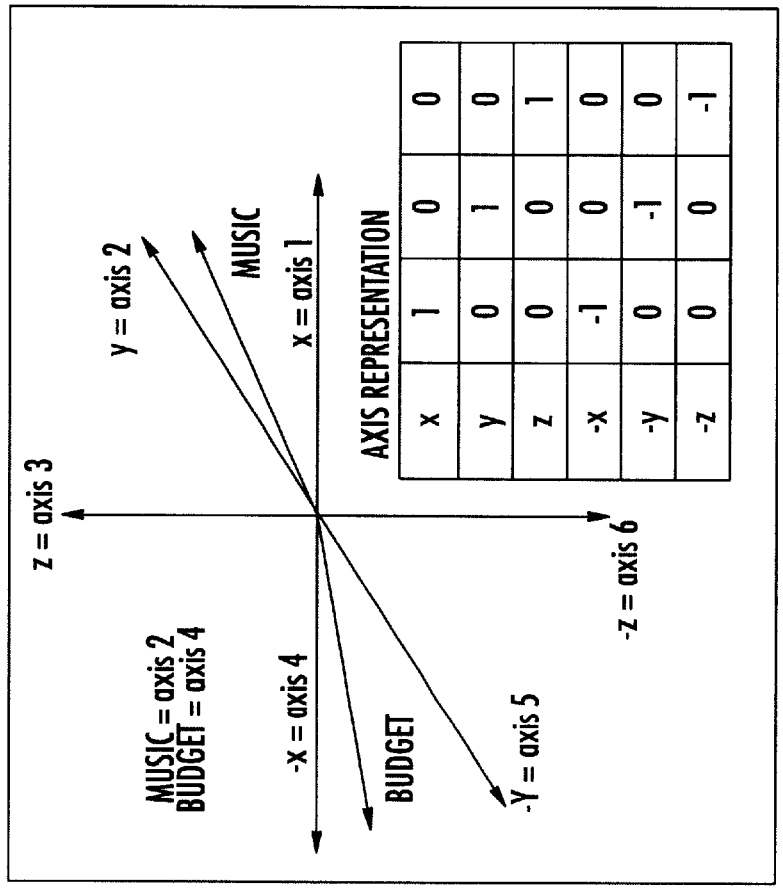
FIG. 2a is a schematic display view of an example vector in 3-dimensional space with the words "budget" and "music" assigned to an axis according to the present invention.

Application of the neural network 18 training rule causes the vectors for words with similar meaning, as defined by similar usage in the document corpus 20, to converge towards each other. Upon completion of training, words are assigned to the closest axis in the n-dimensional vector space. An axis represents the direction of each vector in the n-dimensional space. Words are assigned to the closest axis by taking the highest cosine similarity among the axes. FIG. 2a shows an example vector in a 3-dimensional space, with the words "budget" and "music" being assigned to an axis. FIG. 2b shows a fairly even distribution of words through the first thirty axes.

A document is cleaned by removing stop-words, performing stemming, and inserting compound words. A document is further reduced by examining the word axis representation. Document cleaning and reduction is performed in portion 46, as illustrated in FIG. 1. The number of words in each axis are also counted. The axes containing the highest percentage of words are retained until over 70% of the document is represented. In lieu of 70%, other percentage levels are acceptable. FIG. 3 shows the percentage of words in the first 30 document axes before reduction and after reduction. FIG. 4 shows text of a document that has been reduced from 58 axes to 26 axes.

Reducing the words in a document increases the speed of the document representation and improves the query matching. Reduction increases the match because it removes terms that lower the values of the higher axes used to match other documents. Tests have been performed to determine what is a sufficient amount of document reduction without removing too many words. Reduction beyond 70% begins to remove some of the unique words of the document. Therefore, documents reduced up to 70% give the best performance.

Figure 5:
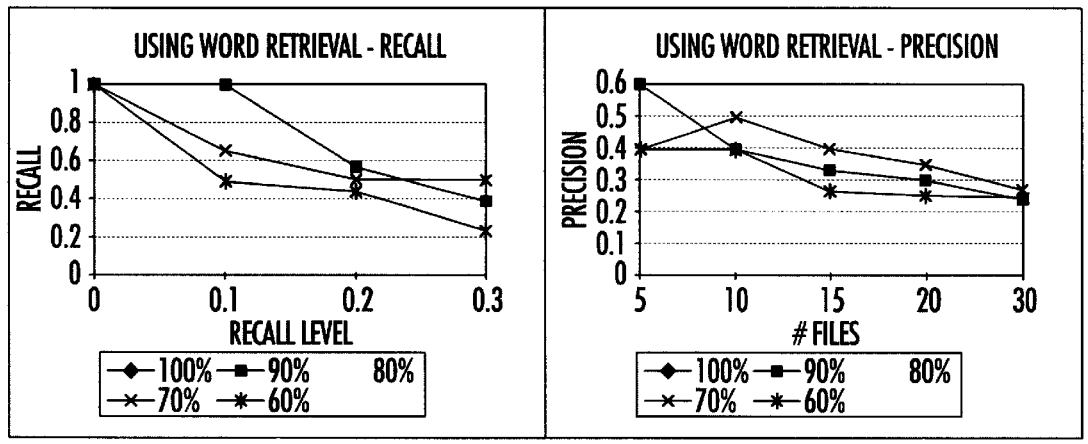
FIG. 5 are graphs of comparative word retrieval recall and precision results according to the present invention.
Figure 6:
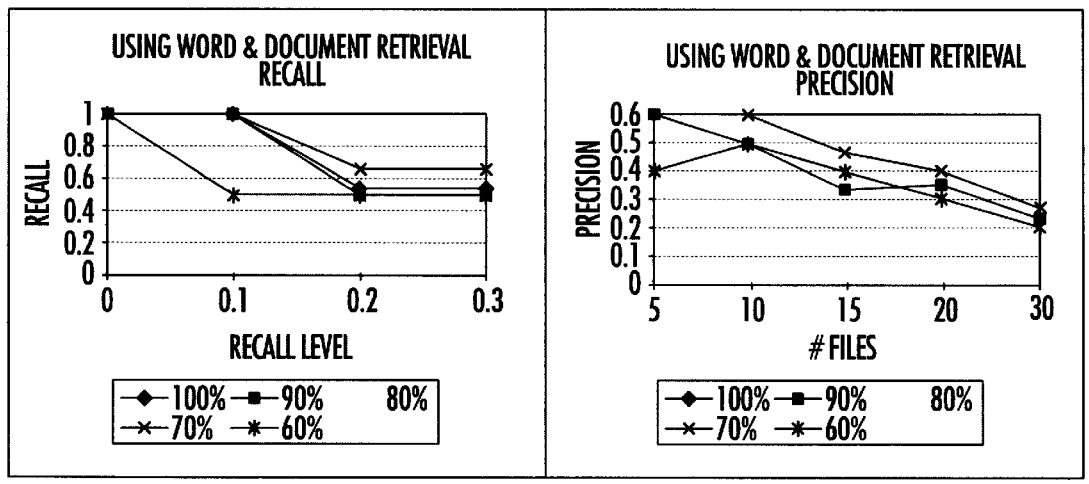
FIG. 6 are graphs of comparative word retrieval recall and precision results according to the present invention.

An example of test results performed on over 2000 web news stories is shown in FIG. 5. The topic was "find awards/honors given to people and things, i.e., television shows". The search started with the set of words: honor, award, mvp, noble prize, and hall of fame. The search was performed on documents which contain 100%, 90%, 80%, 70%, and 60% of the original document. FIG. 5 shows the results using the keyword search. The top 10 relevant documents found in the reduction were then used in the second pass to further define the query. FIG. 6 shows the results of the keyword and document example search.

Information for a document is stored in two ways: a document context vector, and an axis context vector. The document context vector, $X \in \Re^n$, is the sum of all the words that are in the document after clean up and reduction. It is used for building a single document query, and to compare documents and queries. A document's axis context vector is the sum of the words in each axis vector after document clean up and reduction. The axis context vector is used for building a query for a document cluster and the 3-D display. A query, whether it consists of keywords, keyword clusters, example documents, or document clusters, is considered to be like a document. A query is represented by an n-dimensional context vector, $y \in \mathfrak{R}^n$. Therefore, a query can be compared within the document corpus 20.

Positive queries are combinations of words and documents. Single word and single document queries use the entire word/document as the query. When multiple documents are used to build the query, the document axes with the highest usage are used to build the query. Table 3 shows three documents with an example vector size of 6 to build a positive query. In this example, the query is built using axes 1, 3, and 5 since they contain the highest axis usage among the three relevant documents. The default is to use the axis used by all the documents, and the next highest used axes. The user is allowed to lower or raise the number of axes used to build the query.

TABLE 3

Positive Query Example

| Axis | Doc 1 | Doc 2 | Doc 3 |
|---|---|---|---|
| 1 | x | x | x |
| 2 |   | x |   |
| 3 | x | x | x |
| 4 |   |   | x |
| 5 | x |   | x |
| 6 | x |   |   |

Figure 7:
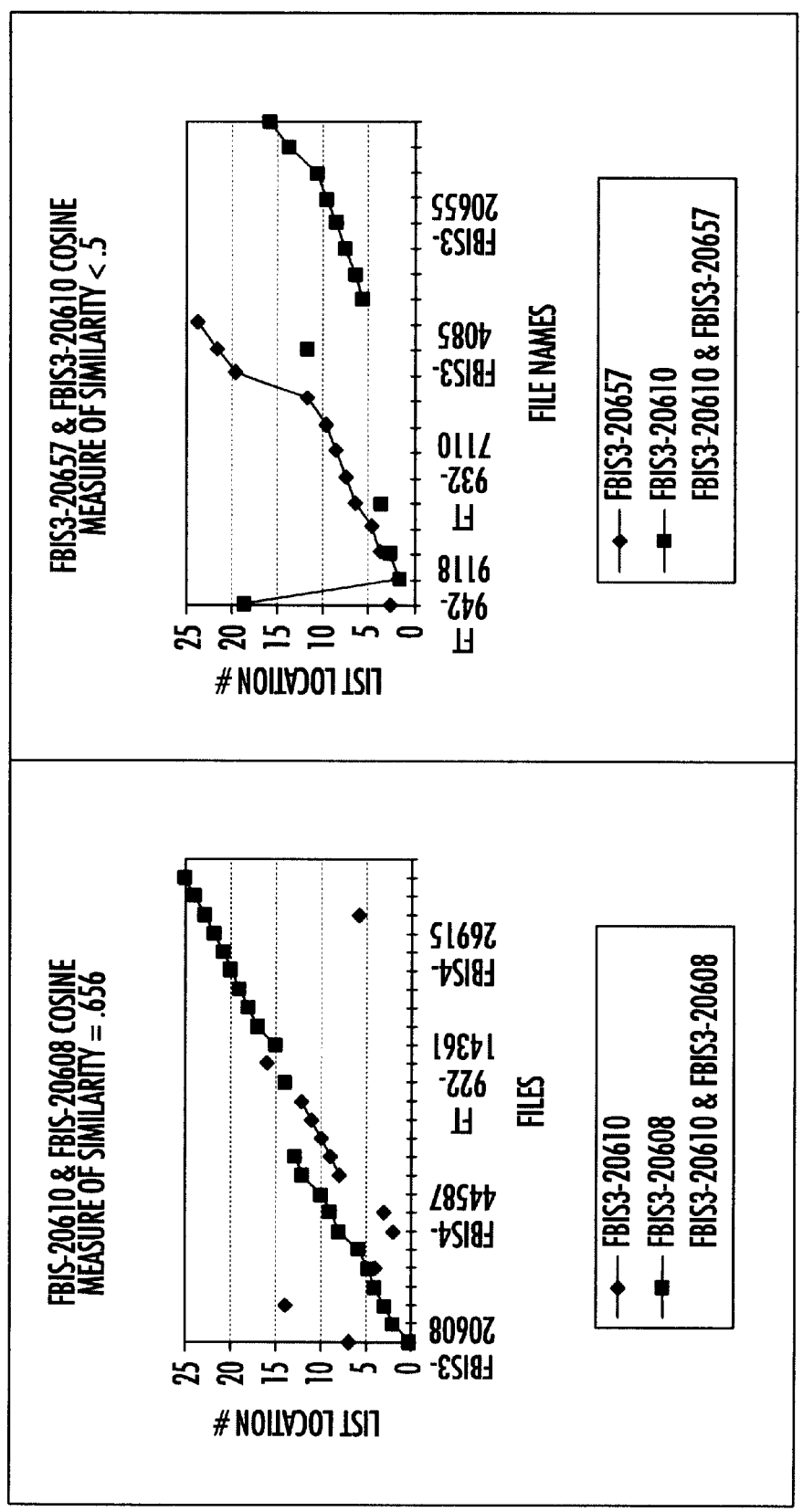
FIG. 7 are graphs illustrating examples of multiple query retrieval according to the present invention.

When building a multiple document query, the documents should be similar. That is, a cosine measure of similarity should be greater then 0.6. Documents lower then 0.6 are not very similar, and it is not beneficial to combine them into one query. FIG. 7 shows examples of multiple query retrieval. The multiple query done on documents with a measure of similarity greater then 0.6 retrieves more relevant documents in the top 25 retrieved documents. The documents retrieved are mainly the documents retrieved by the individual queries, with the multiple query identifying one new relevant document in the top 25. The multiple queries can be used to help further identify relevant documents, through repetition of the document being repeated in several queries. Multiple document queries with dissimilar documents identify more irrelevant documents. These queries correspond to a cosine measure of similarity less then 0.6.

Building a negative query is very similar to building a positive query. Instead of looking for the most frequently used axes, the least frequently used axes are examined. That is, the least frequently used axes in the specified relevant documents relative to the axis used by the bad documents are examined. Table 4 shows a negative query being built. In this example, the least frequently used axes 2, 4, and 6 are used with respect to the good documents to build the negative query. As with building the positive query, the user can also raise or lower the number of axes used in building the negative query.

TABLE 4

Negative Query Example

|       | Relevant Documents |       |       | Bad   |
|-------|-------|-------|-------|-------|
| Axis  | Doc 1 | Doc 2 | Doc 3 | Doc 4 |
| 1     | x     | x     | x     | x     |
| 2     |       | x     |       | x     |
| 3     | x     | x     | x     |       |

TABLE 4-continued

Negative Query Example

|       | Relevant Documents |       |       | Bad   |
|-------|-------|-------|-------|-------|
| Axis  | Doc 1 | Doc 2 | Doc 3 | Doc 4 |
| 4     |       |       | x     | x     |
| 5     | x     |       | x     |       |
| 6     | x     |       |       | x     |

The retrieval system 10 initiates each retrieval engine to calculate a document's score for each query. The retrieval engines maintain only the high level scores. The retrieval system 10 standardizes the scores from each retrieval engine to range from 0 to 1. The user can adjust the lowest acceptable score and retrieval engine weight to effect score results to favor/disfavor a particular retrieval engine. A ranking processor 22 uses an algorithm to fuse the results of the retrieval engines and ranks the documents based on the number of times the document was selected, highest score, lowest score, average score, location in the query list and number of retrieval engines locating the document. Irrelevant documents and queries can be removed. Each topic is made up of multiple queries from each of the retrieval components. The scores are scaled by query and for the entire topic, i.e., all the queries. Each set of scores are a separate entry into the ranking algorithm.

The query 42 for the VSM 16 contains the entire vector and the axis vectors. Scores are obtained by taking the cosine similarity measure of the query vector with the entire vector of each of the documents in the document corpus 20. The closer to one the better the match, where only high positive scores are kept. If none of the document scores equals the value 1, then the documents are scaled based on the highest score for the query. This is a quick method of increasing the scores on potentially relevant VSM documents, thus allowing fusing of the VSM highest results with the n-gram result scores.

Figure 8:
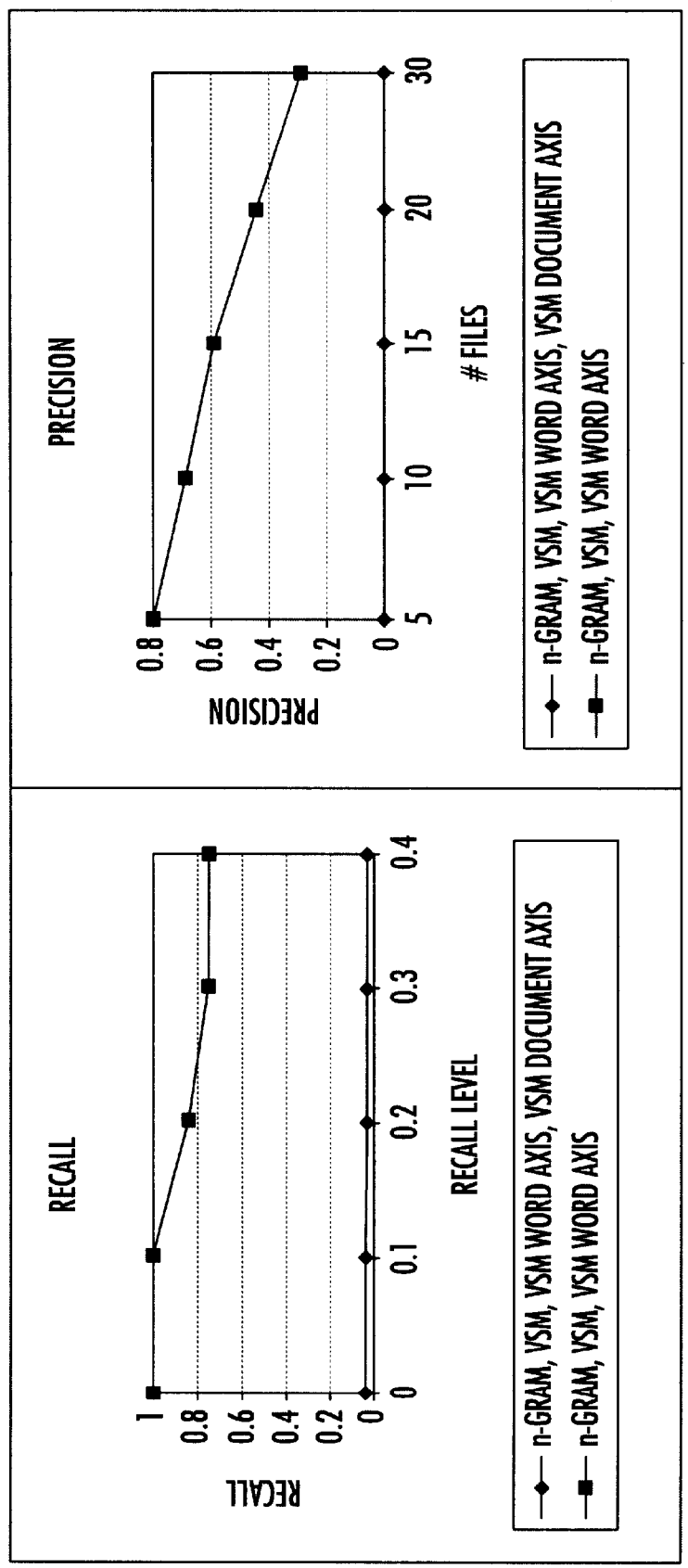
FIG. 8 are graphs illustrating recall and precision of an example search using the VSM document axis according to the present invention.

A cosine similarity measure of the query vector against the corresponding axis of the documents in the document corpus 20 can also be applied. In this case, applying a cosine similarity measure is also useful for word queries. However, the axis for the document typically contain a large number of axes, and a large number of documents unrelated to the topic are retrieved. Using the example search that retrieved 2000 web news stories, retrieved documents describing "awards/honors given to people and things receiving awards" shows the effect of using the document axis queries, as shown in Table 5 and FIG. 8. Using the VSM document axis the precision and recall scores are lower, and 16% more irrelevant documents were retrieved. This causes more work to be performed in locating relevant documents.

TABLE 5

Example of Using VSM Document Axis

|  | n-gram, VSM, VSM word axis | n-gram, VSM, VSM word axis, VSM document axis |
|---|---|---|
| Number relevant documents located | 12 | 17 |
| Number relevant documents in the corpus | 17 | 17 |
| Number documents retrieved | 42 | 705 |

Referring back to the n-gram retrieval engine 14, the number of occurrences of the least frequent term (n-gram)

are counted. Since most early searches on the topic are keyword(s), the filter quickly identifies candidate documents to be reviewed early in the retrieval process. The filter is especially useful for keywords or phrases which may not have appeared in the document corpus 40 used to train the VSM 16 component of the retrieval system 10. The identified relevant documents are used on the next pass through the retrieval system 10. A tri-gram was selected due to the speed of processing and small amount of storage for the least frequency table corresponding to block 34 in FIG. 1.

The n-gram frequency count can vary widely. The n-grams need to be in the range from 0 to 1 to correspond with the standardized range. The documents having a large number of the specified tri-grams (3-grams) appearing in one document were examined. The documents were divided into three groups: few matches, high matches, and scaled documents. The few matches were removed from the scaling calculation. Few matches consists of a large number of documents (greater than 50) with a couple of matches (approximately ranging from 1–20 matches) per document. High matches have a large number of matches in a single document. These documents need to be examined and are set to a value 1. The remaining documents are scaled between 0 and 1. The scaling helps to identify documents that have the most 3-gram matches and should be reviewed. As a further note, taking the mean or dividing by the largest number does not provide a good representation of the n-gram documents. Furthermore, looking at a document that had only had a few matching occurrences is not desirable.

A statistical method is used to locate the clusters of interes to be scaled. The mean and standar deviation are calculated without the largest n-gram frequency value. If the largest value fits within three standar deviations of the mean, then the number is used as the scaling factor. If the largest value does not fit, it is considered to be outside the cluster range. When the process is repeated, it takes out the nex larges value. Accordingly, this process is repeated until the largest removed frequency value falls within the range of the third standard deviation. Numbers larger than the selected scaling number are set to one. An example of calculating the scaling value is show in Table 6.

TABLE 6

Scaling Example

|   | Original Data | Removed Largest # | Removed Next Largest # |
|---|---|---|---|
| n-Gram Frequency Occurrence | 1<br>2<br>1<br>3<br>12<br>2<br>2<br>1<br>1 | 1<br>2<br>1<br>3<br>2<br>2<br>1<br>1 | 1<br>2<br>1<br>2<br>2<br>1<br>1 |
| Mean | 2.77 | 1.625 | 1.42 |
| Standard Deviation | 3.52 | 0.744 | 0.534 |
| 3 Standard Deviations | 13.33 | 3.857 | 3.03 |
| Comment | If used largest value. 12/12 = 1 3/12 = 0.25 | Remove the largest # -12. The # 12 does not fall within three standard deviations of the remaining values | Remove the next largest # - 3. The # 3 does fall within three standard deviations. Use 3 as the scaling factor. All numbers larger than 3 are set to 1. |

TABLE 6-continued

Scaling Example

|   | Original Data | Removed Largest # | Removed Next Largest # |
|---|---|---|---|
|   | 2/12 = 0.16<br>1/12 = 0.08<br>It is doubtful that anything other then the document with the value of one would be reviewed | | 12 = 1<br>3/3 = 1<br>2/3 = 0.66<br>1/3 = 0.33<br>The documents with values 1–0.66 would probably be reviewed. |

Table 7 shows the number of files used to calculate the n-gram scaling factor applied to data provided for a TREC-6 conference. TREC is an acronym for Text REtrieval Conference. This conference is a workshop series that encourages research in information retrieval from large text applications by providing a large test collection, uniform scoring procedures, and a forum for organizations interested in comparing their results.

TABLE 7

Number of Files Used to Calculate the n-gram Scaling Factor

|   | Query #301 | Query #337 | Query #350 |
|---|---|---|---|
| # Files | 79,777 | 550 | 3,271 |
| Range of files dropped out (# matches/file) | 1–18 | 1–3 | 1–10 |
| # of files dropped out | 79,155 | 434 | 2,547 |
| Average | 60 | 10 | 48 |
| # Documents Scaled | 522 | 73 | 538 |
| Range of files where documents = 1 | 60–829 | 4–10 | 48–7,789 |
| # Documents = 1 | 100 | 43 | 186 |

The user specifies the lowest acceptable score for each of the retrieval engines. This helps eliminate the lower scoring documents. This also controls the number of documents shown to the user. The higher the number, the fewer the documents shown to the user. Additionally, the documents should reveal better matches to the query. Each retrieval engine is assigned a specific percentage by the user. The document scores for the retrieval engine are reduced by the specified percentage. Depending upon the query type, different retrieval engines can be emphasized. For example, potentially misspelled words may put more emphasis on the n-gram search engine 14. Document example queries place more emphasis on the VSM search engine 16. An algorithm ranks the document scores from the different retrieval engines. The algorithm rates the following items: number of times document identified per query and per retrieval engine, maximum and minimum score, average score and penalty points. An algorithm performing these functions is well known to one skilled in the art and will not be described in further detail herein. The ranking is thus determined by a score.

Figures 9, 10:
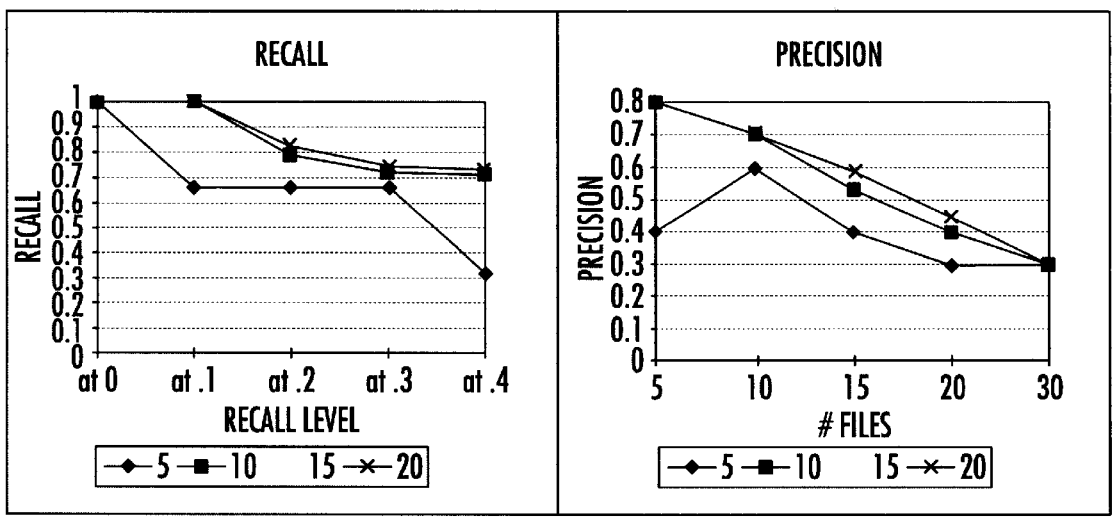
FIG. 9 are graphs illustrating selection of document retrieval engine penalty according to the present invention.
FIG. 10 is a diagram illustrating an assignment of the list location penalty according to the present invention.

Each item is ranked except for the penalty points. A higher number results in a lower score. The individual items are totaled and the lowest final score indicates the best document. Penalty points are assigned to a document based on the retrieval engine and the document location in the ranked list. A penalty is added to a document for each retrieval engine not identifying it as relevant. Multiple engines retrieving the document is a strong indication of a relevant document. The score must be above the supplied value after it is calculated according to predetermined scaling and retrieval engine weight. If all the engines retrieve the document, then the penalty score is 0. Referring to FIG. 9, the value 200 was chosen because it supplied enough of a penalty that it moved a document's rank below documents that appeared in more then one method.

The algorithm allows each document to receive a penalty point for its location in each query list. This is intended to reward the documents that are located close to the top of the list in the individual queries, by assigning fewer penalty points. FIG. 10 further illustrates the penalty point assignment. Once the penalties are assigned for each query, the document's final list location based on all the queries results is calculated. The final location is based on the scores of the number of times the document is identified, maximum, minimum, average score, number of retrieval engines locating the document, and the list location penalty. In addition, location of the individual queries can also improve the results.

High precision in the retrieval system 10 is derived by providing users multiple input interaction modes, fusing results obtained from multiple information retrieval search engines 14 and 16, each supporting a different retrieval strategy, and by supporting relevance feedback mechanisms. The basic premise of relevance feedback is to implement information retrieval in multiple passes. The user refines the query in each pass based on results of previous queries. Typically, the user indicates which of the documents presented in response to an initial query are relevant, and new terms are added to the query based on this selection. Additionally, existing terms in the query can be re-weighted based on user feedback.

Primary user interaction with the retrieval system 10 is through a web-browser-based user interface 12. Users can build and tailor queries as the topic of interest is further defined, moving from a generic search to specific topic areas through query inputs. Queries may consist of a single keyword, multiple keywords (or phrases), keyword clusters, an example document, and document clusters. In addition, a user can increase or decrease the system precision, effecting the number of documents that will be rated as relevant. The weights on the retrieval engines can be modified to favor different engines based on the type of query.

Figure 11A:
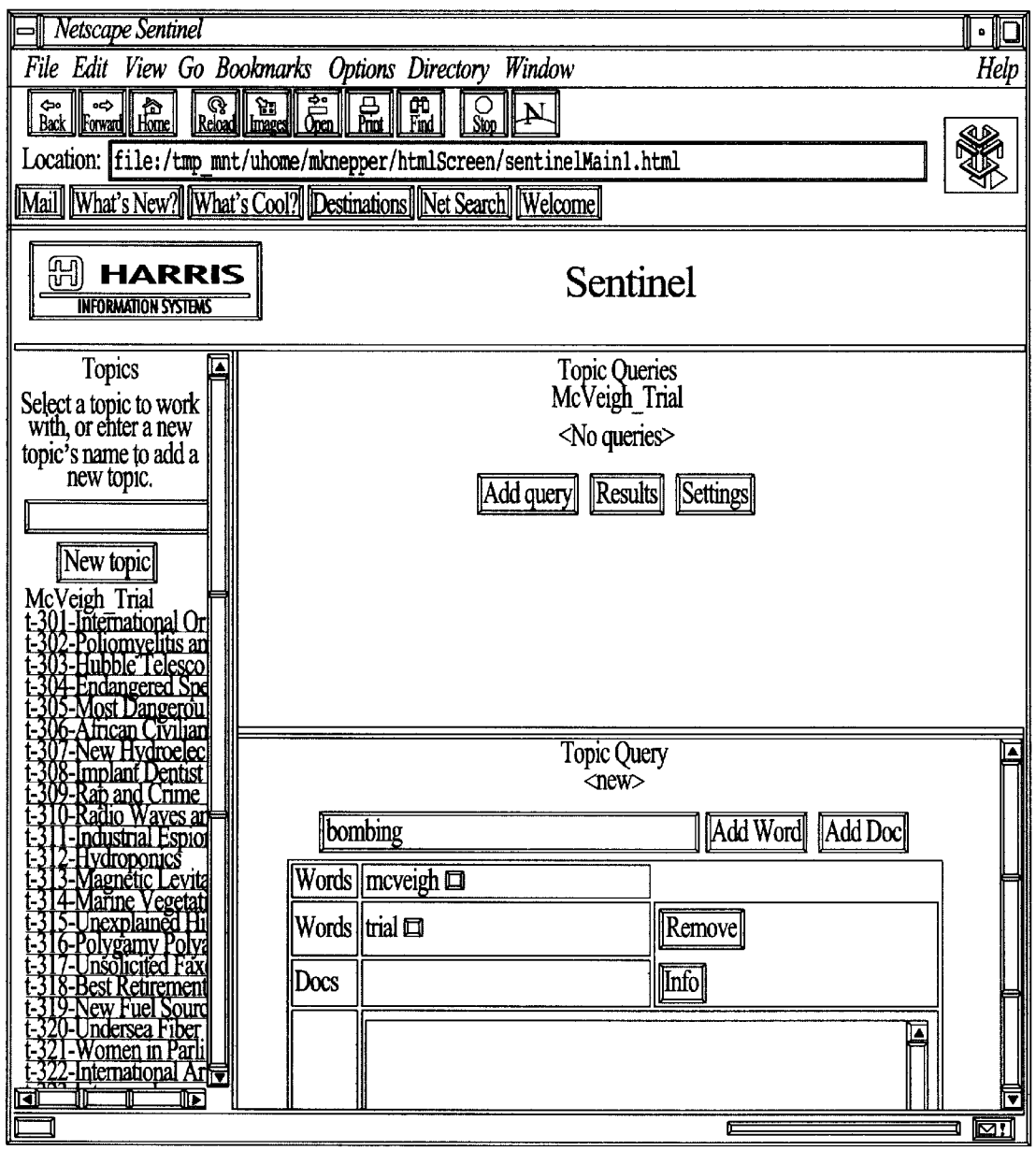
FIGS. 11a–11d are display screens for example searches according to the present invention.
Figure 11B:
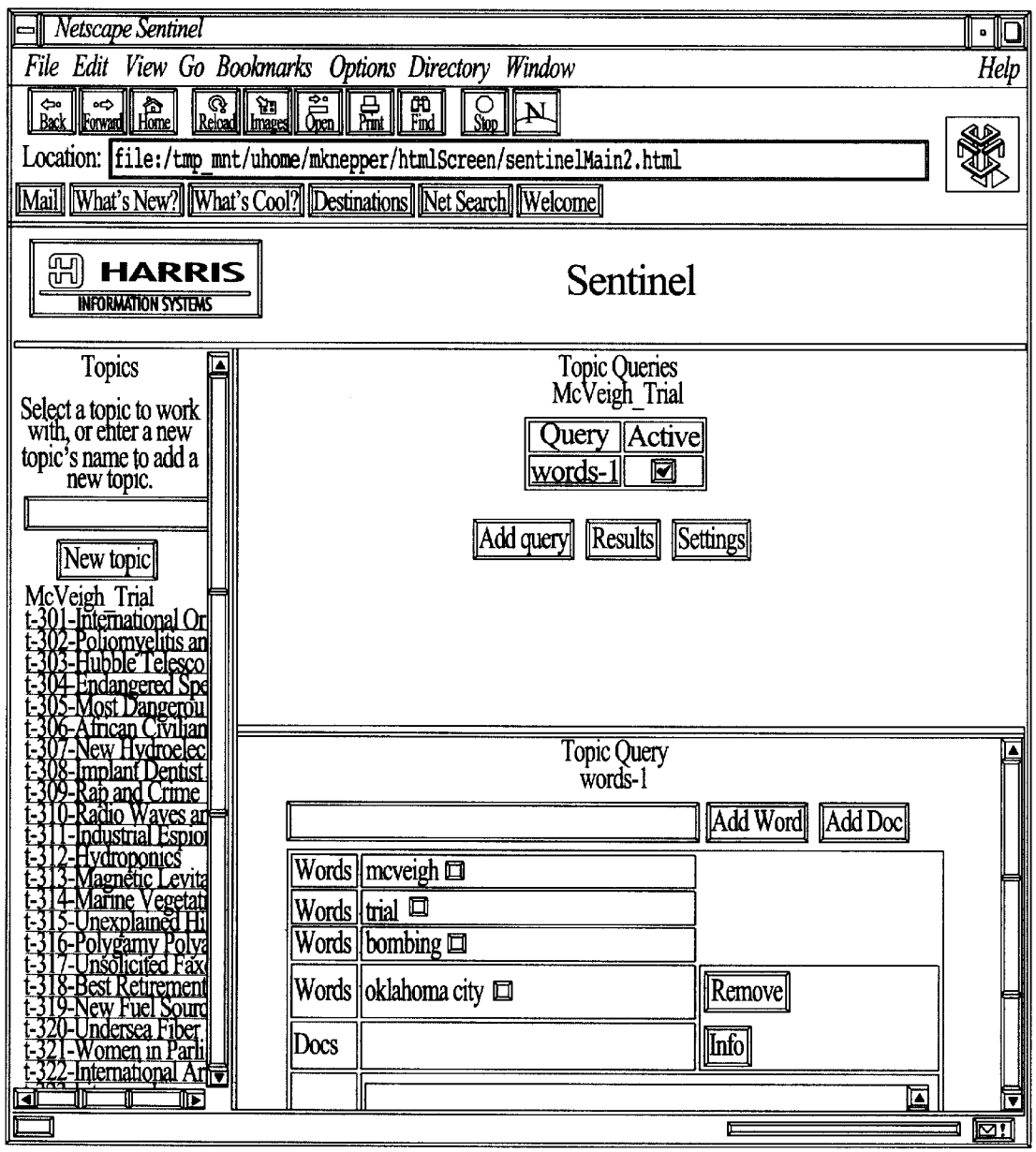

A set of documents retrieved for a particular topic many exhibit a variety of aspects. This can be seen, for example, in a search retrieving information about the Oklahoma City bombing of 1996. There are relevant articles about the bomb, damage from the bomb blast, rescue work, the victims, suspects, the Timothy McVeigh trial, and the Terry Nichols trial, just to name a few. In particular, the retrieval system 10 is used to search for documents relevant to the trial of Timothy McVeigh for the Oklahoma City bombing. The document corpus consists of over 2000 news stories from the CNN web site on a variety of topics. In this case, a user begins by creating a new topic of interest: McVeigh Trial. Since this is a new topic, there are no queries associated with the topic. So the user creates a query by entering a few keywords: "McVeigh", "trial", "bombing", and "Oklahoma City", as shown in FIG. 11*a*. This initial query is labeled "words-1" and added to the list of queries for a McVeigh trial topic, as shown in FIG. 11*b*. The user has the retrieval system 10 execute this query.

Figure 11C:
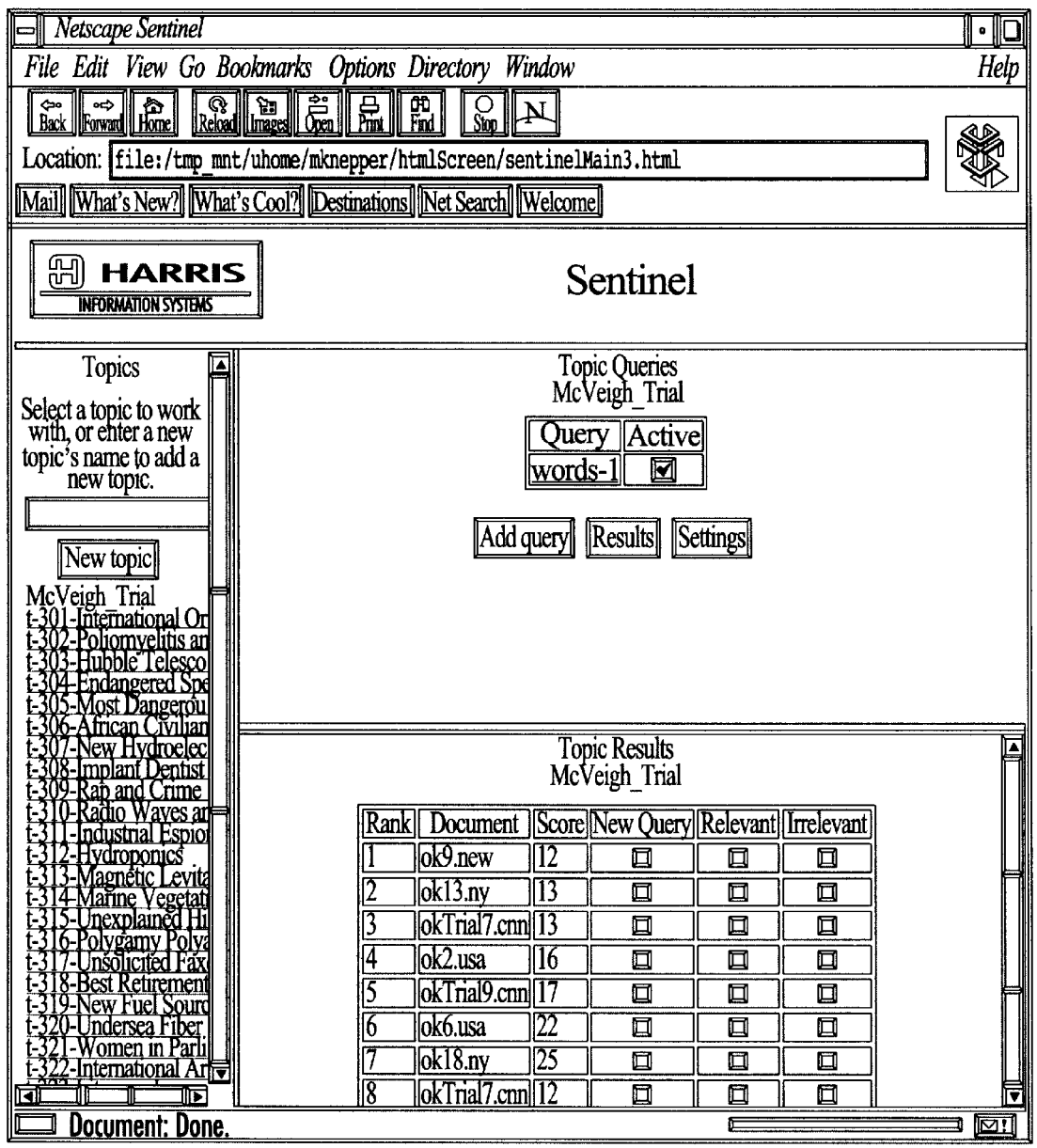
Figure 11D:
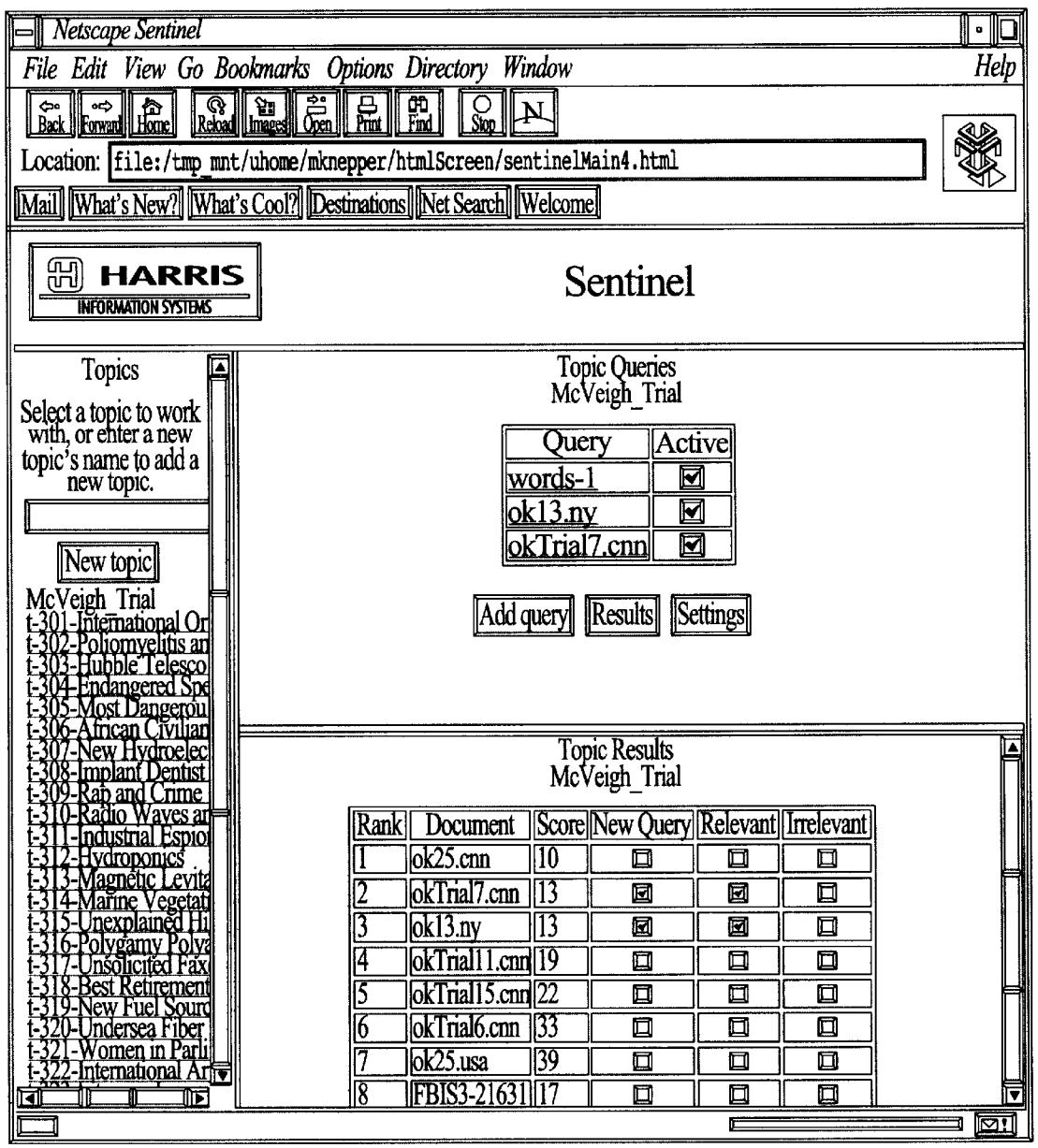

As illustrated in FIG. 11*c*, a ranked list of documents, complete with score, is returned to the user. Clicking on the document retrieves the text through HTML hyperlinks. This enables a user to determine the relevance, from his point of view, of a document to the topic. Top documents can be reviewed, and both relevant and irrelevant documents are identified and marked as such. Irrelevant documents are filtered from subsequent queries. Removal of the higher-scoring irrelevant documents allows lower scoring documents to be accepted on the final result list. Documents can also be marked for use as examples in additional queries for the topic. Such stories are then added to the list of queries, as shown in FIG. 11*d*.

In the retrieval system 10, visualization display means comprises an n-dimensional document visualization display for enhancing user understanding of the retrieved document set. This tool supports multiple levels of data abstraction, clustered document presentation, data thresholding, and a variety of user interaction paradigms. The n-dimensional document visualization display enables the user to view different aspects of the document's topic. The visualization display means displays a similarity measure of the documents. The information retrieval system 10 is thus able to reduce the display down to the most important aspects of the document.

The Oklahoma City bombing stories have a number of different aspects: the bomb, building damage, the victims, victim's families, the Timothy McVeigh trial, etc. Displaying documents in a 3-dimensional space enables a user to see document clusters, the relationships of documents to each other, and also aids in the location of additional documents that may be relevant to a query. Documents near identified relevant documents (through queries) can be easily reviewed for topic relevance. The user is able to manipulate the dimensional view to gain new views of document relationships. Changing the document's dimensionality allows the information to be viewed for different topic aspects to aid in further identification of relevant documents.

Figure 12A:
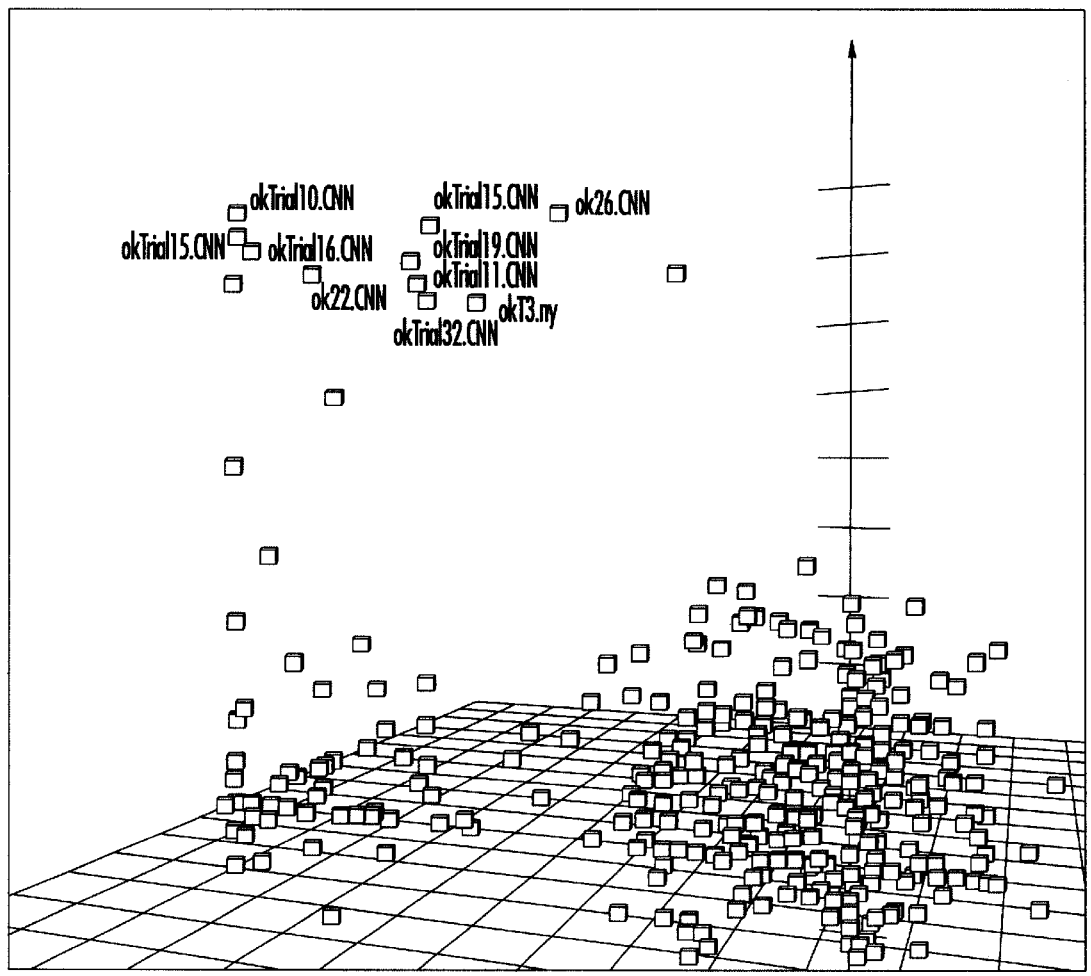
FIG. 12a is a display screen showing an example of the 3-dimensional viewer containing documents retrieved for the McVeigh trial topic using the query keywords: McVeigh, trial, Oklahoma City, and bomb, according to the present invention.

FIG. 12*a* shows an example of the 3-dimensional viewer containing documents retrieved for the McVeigh trial topic using the query keywords: McVeigh, trial, Oklahoma City, and bomb. Document locations are represented in space by a box. Additionally in this view, documents determined as relevant by the information retrieval system 10 displays the document name next to the box. Clustering of documents can be observed in several areas. A first cluster is with respect to the Mcveigh trial stories, plus additional stories related to the topic, but not identified by retrieval system 10. A second cluster is with respect to the Bosnia stories deals with bombing, and are near the keyword "bomb". A third cluster is with respect to the O. J. Simpson trial stories, and appears near the word "trial".

Referring to FIG. 12*a*, each document in the retrieved document corpus may be represented mathematically in the 3-dimensional space by a colored cube. For example, a red cube could represent a query request—in this case the words "trial", "bombing", "McVeigh" and "Oklahoma City". Yellow text could be used to indicate the relevant documents found through text queries submitted to the retrieval system 10. Additional colors may be used to indicated document clusters, i.e., documents related in some aspect. The colors selected to represent a query request, relevant documents and document clusters are not limited to red and yellow. These colors are for illustrative purposes, wherein other colors are acceptable for indicating such information to a user. Therefore, using different colors to represent different aspects of the retrieved documents on the display would allow the user to more quickly identify the relevant information to be retrieved.

Figure 12B:
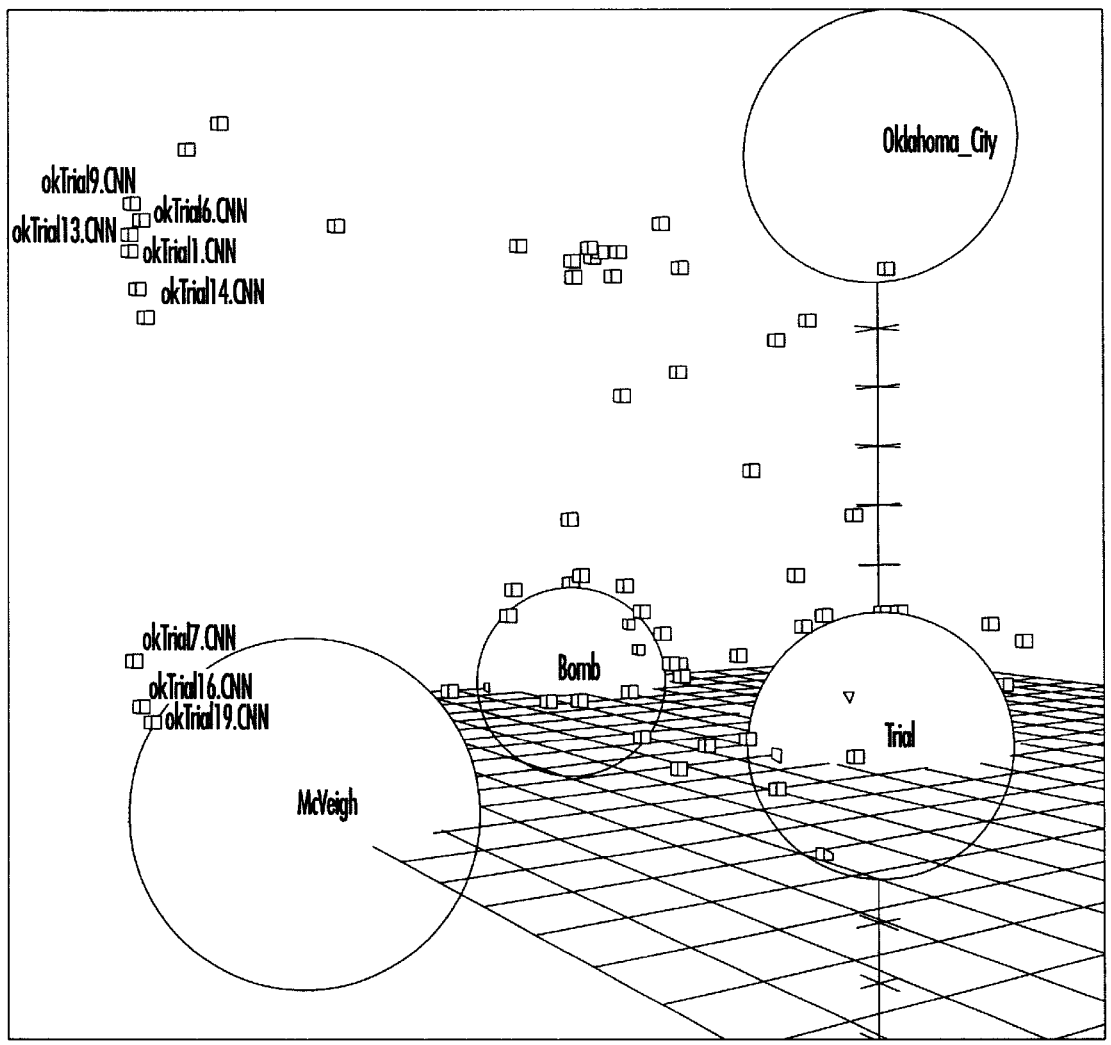
Figure 13:
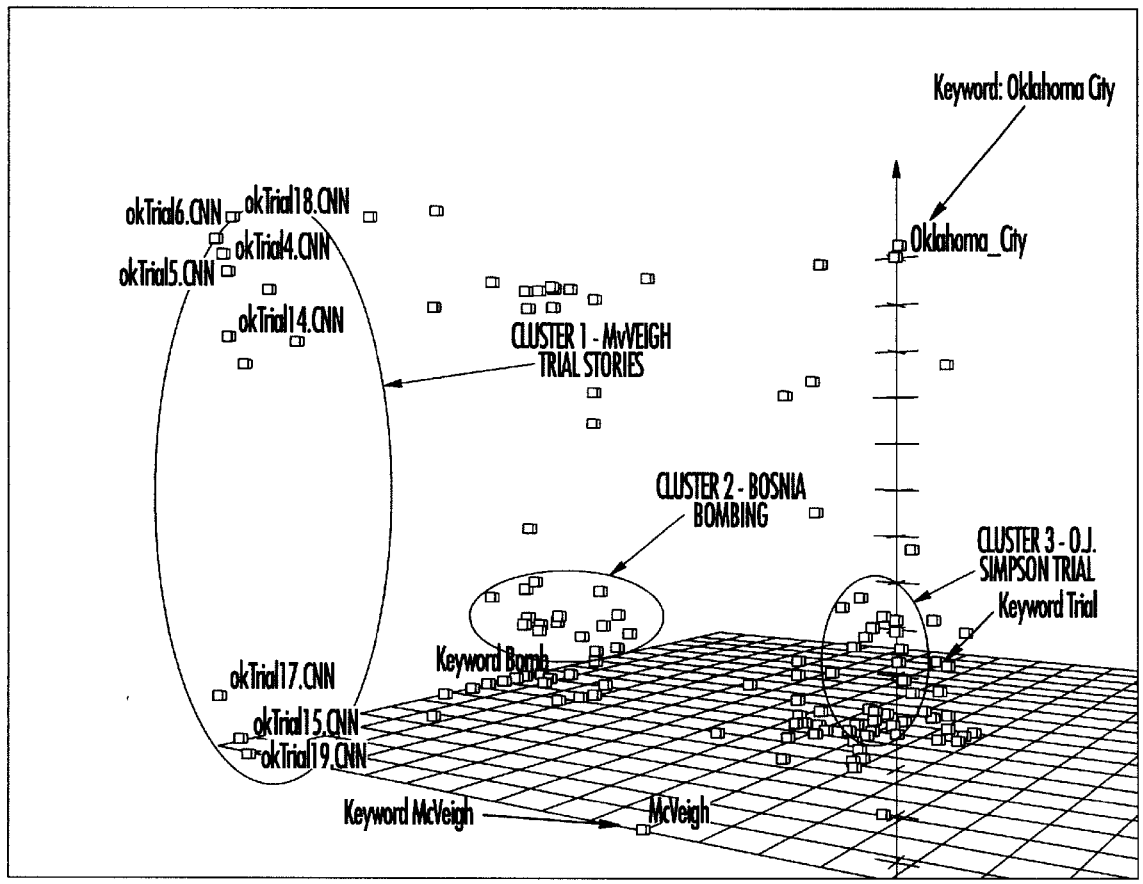

The information retrieval system's 10 3-dimensional view enables a user to quickly identify document clusters around queries by plotting spheres around each query. FIG. 12b shows spheres drawn around the keywords in the "words-1" query. A user can "fly" into the sphere to explore the documents clustered around a query. FIG. 13 shows the clustering of documents in several areas. As previously stated, Cluster 1 corresponds to the McVeigh trial stories, plus additional stories related to the topic not identified by the information retrieval system 10. Cluster 2 corresponds to Bosnia stories dealing with bombing, and are near the keyword "bomb". Cluster 3 corresponds to the O. J. Simpson trial stories, and appears near the word "trial". FIG. 13 clusters found in the 3-dimensional keyword view of higher ranking documents in the corpus include McVeigh trial stories, Bosnia bombings, and O. J. Simpson trial stories.

Figure 14A:
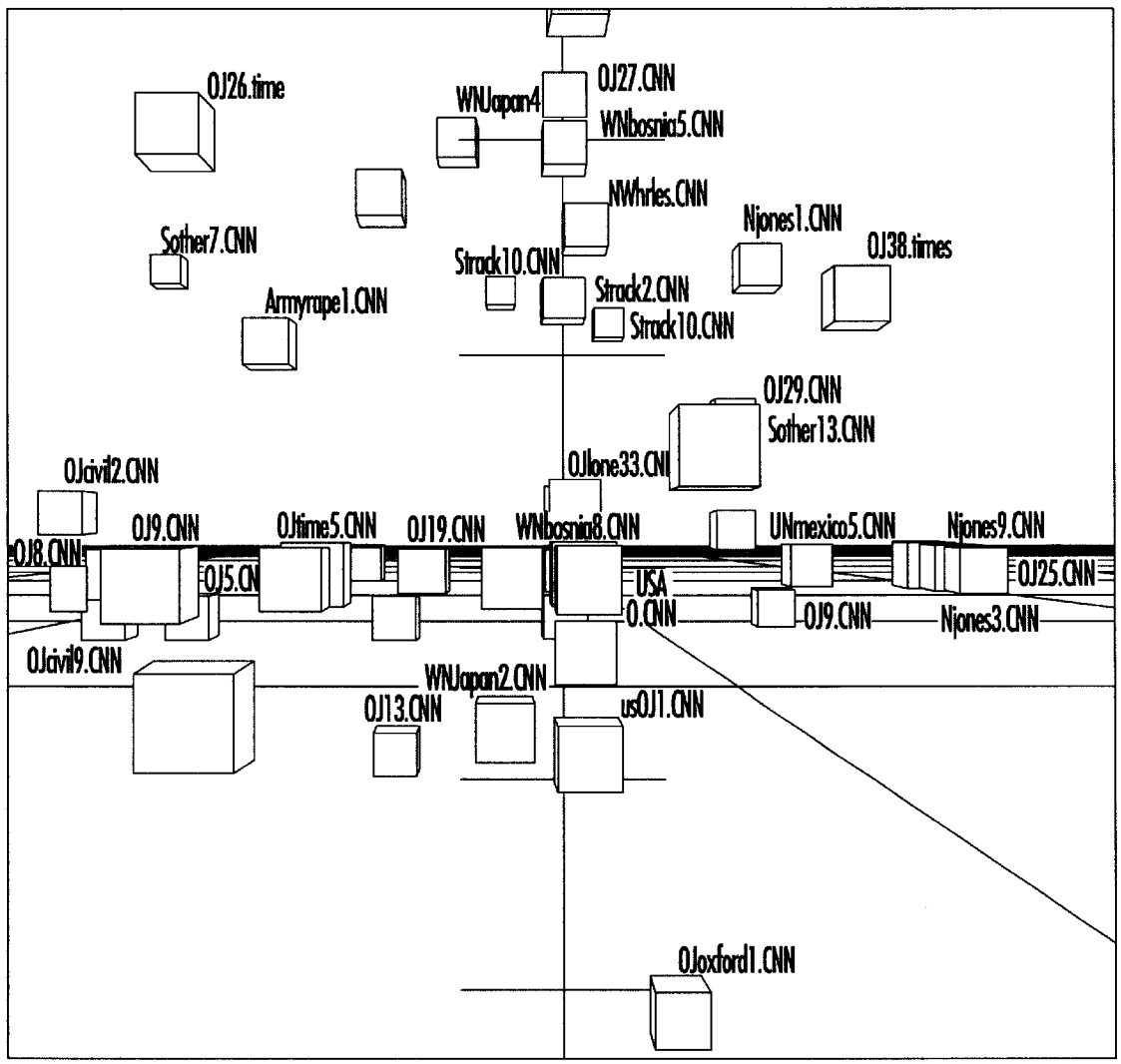
Figure 14B:
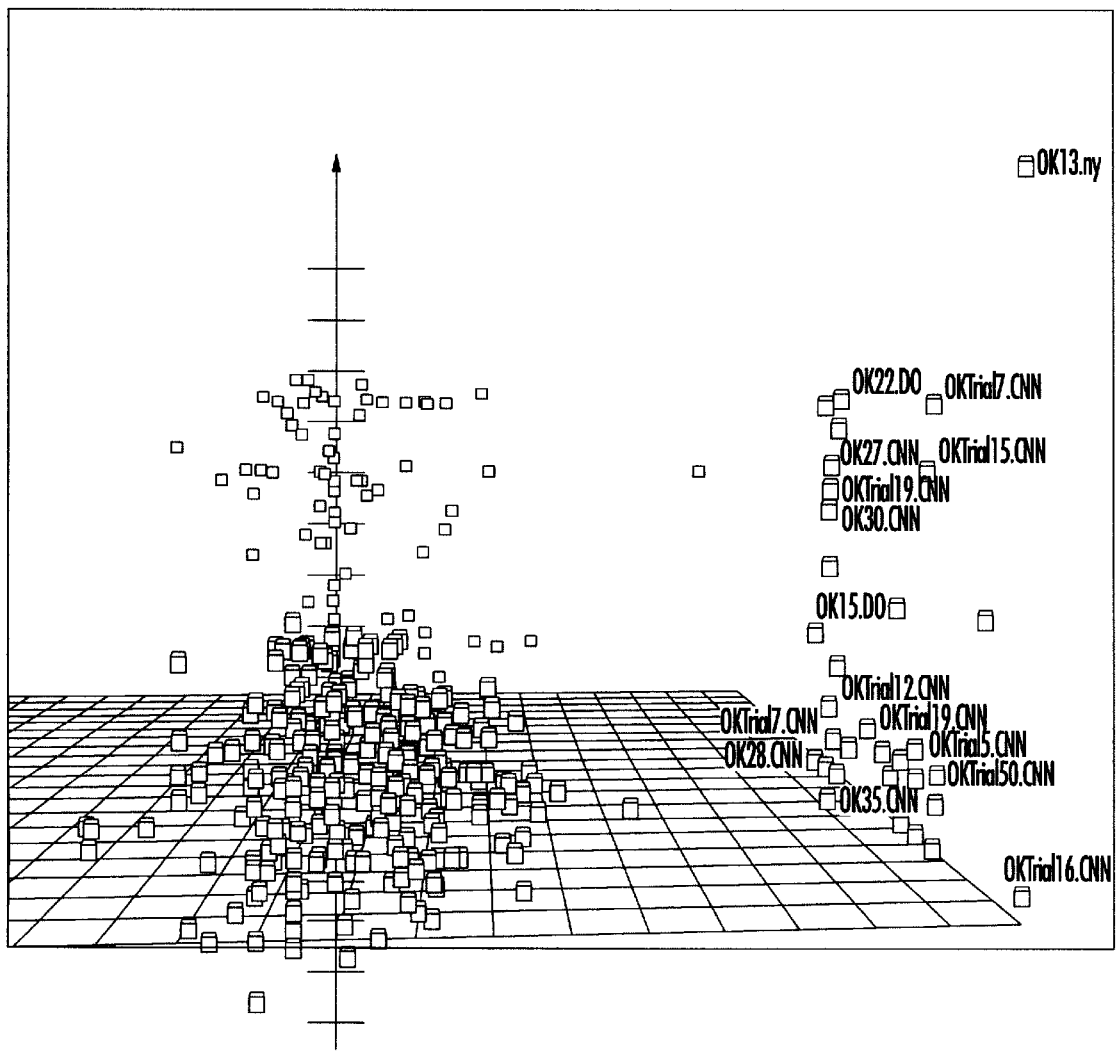

FIG. 14a shows a close-up focused on the word "trial", and the text has been turned on so that the file names of documents represented by the boxes are also displayed. It is noted that the O. J. Simpson trial articles have clustered near the word trial. A user can double click on any of the boxes to bring up the associated document. FIG. 14b shows another perspective on the whole corpus of retrieved documents using different dimensions. Again, it is noted that the relevant stories appear to separate from the other stories using the retrieval system 10. To look at some of the documents which have not been identified, the user can double click on any of the boxes to bring up the associated document, and make an inspection to determine whether or not it is relevant to the Timothy McVeigh trial.

The information retrieval system 10 has been evaluated using the benchmark data and query sets provided by the National Institute of Standards and Technology as part of the 6th Text REtrieval Conference (TREC-6). The results obtained demonstrated high precision for limited-sized retrieval sets. As previously stated, the Text REtrieval Conference (TREC) workshop series encourages research in information retrieval from large text applications by providing a large test collection, uniform scoring procedures, and a forum for organizations interested in comparing their results. TREC has become the major experimental effort in the field of information retrieval. The information retrieval system 10 of the present invention competed in the Manual Ad Hoc Retrieval task for the large data set. During TREC, the n-gram search engine 14 was used as a high speed filter to provide document examples. The VSM search engine 16 was used for final retrieval and document scoring.

There are two primary measures employed in the TREC competition; precision and recall. Precision is the percentage of documents from the retrieved set that are relevant to the query. Recall is the percentage of relevant documents retrieved from the total number of relevant documents available within the collection. Time constraints and interest-level limit the typical user of an information retrieval system to reviewing the top documents before determining if the results of a query are accurate and satisfactory. The user needs precise, representative documents at the top of the list to make this determination. Accordingly, the information retrieval system 10 emphasizes precision (accuracy) and speed while retrieving relevant documents high on the list. The information retrieval system 10 permits the user to build and tailor the query as he or she further defines the topic. The system also permits movement from a generic search to a specific topic area through query inputs.

Figure 15:
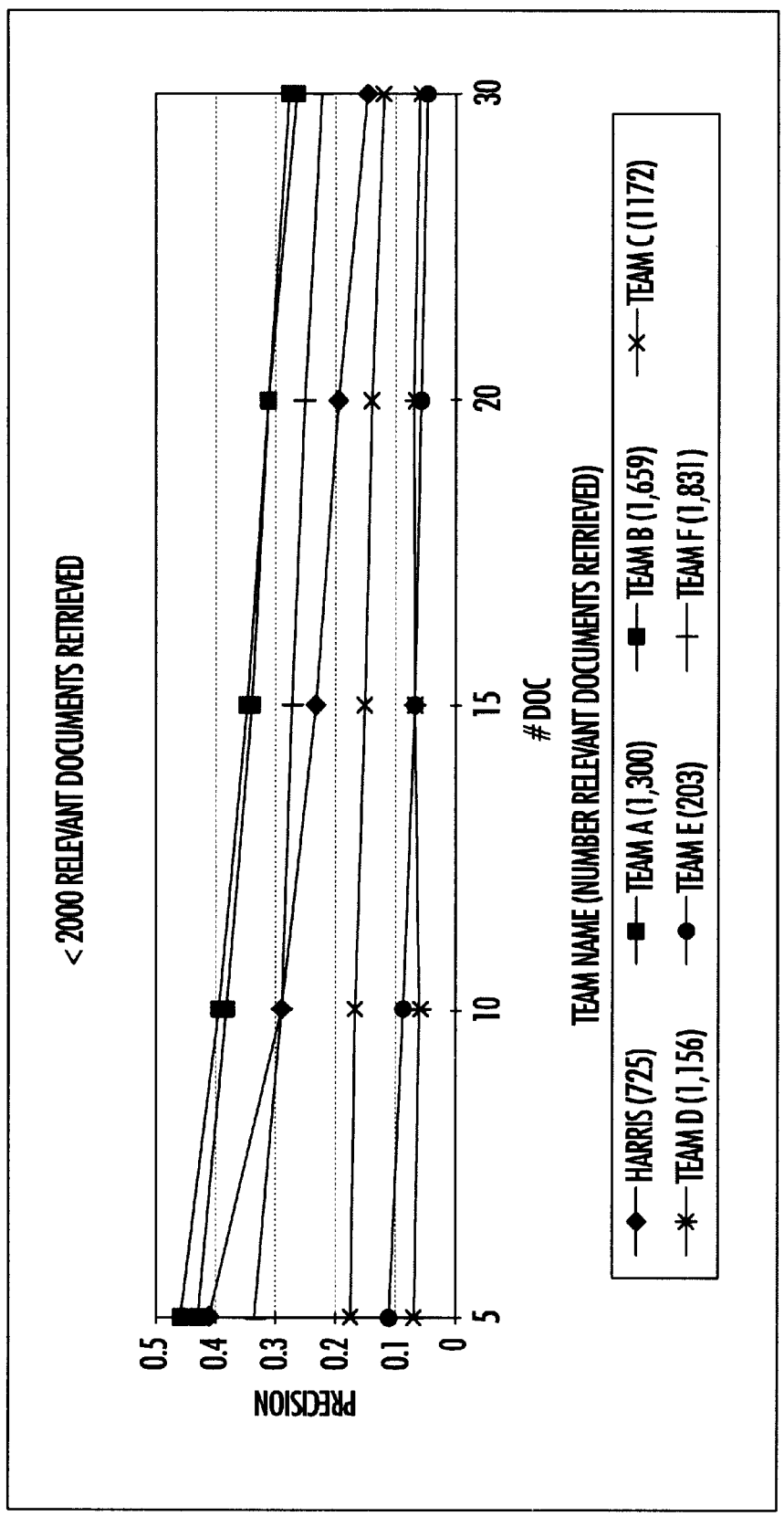
FIG. 15 is a graph showing precision scores from the TREC-6 Ad Hoc Manual Track Competition according to the present invention.
Figure 16:
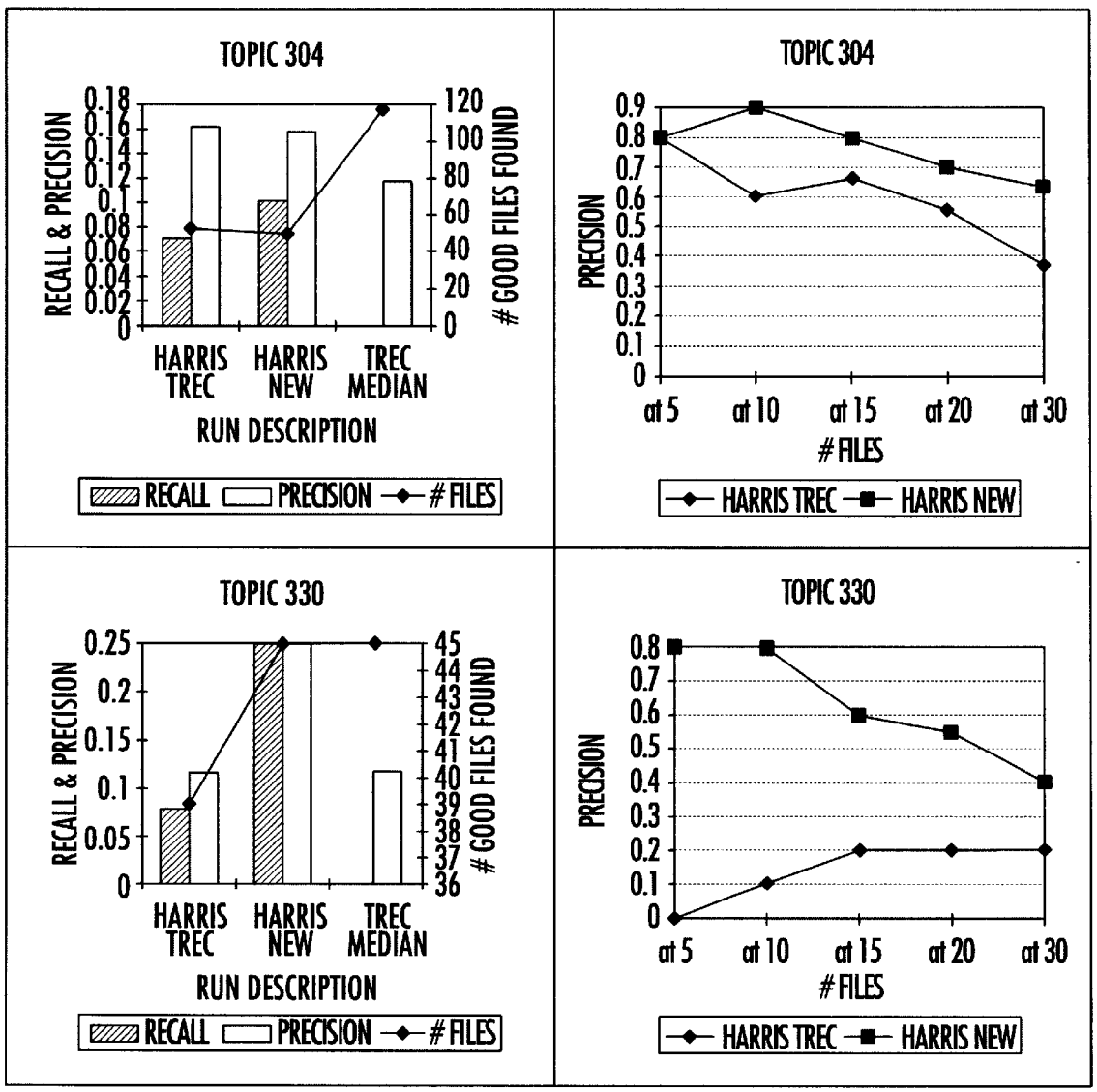
FIG. 16 are graphs showing results using a modified ranking algorithm according to the present invention.

In comparing precision results using the present invention with other TREC teams that retrieved a similar number of documents, the information retrieval system 10 maintains a high level of precision for the top 5, 10, 20 and 30 documents retrieved. As FIG. 15 illustrates, precision for the Applicants' invention (which is assigned to Harris corporation) is higher than the other TREC teams that retrieved more relevant documents. This fits well with the fact that time constraints and interest-level on the part of an information retrieval system user often limit the user to reviewing the top documents before the user determines if the results of a particular query were accurate and satisfactory. During TREC, the documents were scored for the entire topic, i.e., all the queries were combined into the ranking. A modified algorithm included individual query list locations into the overall scoring, which improved the results, as shown in FIG. 16.

CONCLUSION

The information retrieval system 10 is an efficient, high-level precision information retrieval and visualization system. The information retrieval system 10 allows interactive formation of query refinement, and fuses results form multiple retrieval engines to leverage the strengths of the each one. In addition, the information retrieval system 10 allows for efficient maintenance, i.e., making it easy to add new documents. The information retrieval system 10 also allows for multiple dictionaries and vocabularies, thus allowing a user to develop role-based dictionaries and/or vocabularies for searching specific databases. The information retrieval system 10 provides a user interface for user interaction as well as a 3-dimensional presentation of the retrieved documents for more efficiently exploring the documents retrieved in response to a user's search query.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An information retrieval system for selectively retrieving documents from a document database, the system comprising:
   an input interface for accepting at least one user search query;
   a plurality of search engines for retrieving documents from the document database based upon the at least one user search query, each of said search engines producing a common mathematical representation of each retrieved document;
   a display; and
   visualization display means for mapping respective mathematical representations of the retrieved documents onto said display, and comprising
      keyword display means for displaying keywords from the at least one user search query, and
      cluster display means for displaying retrieved documents in clusters surrounding respective user search queries.

2. An information retrieval system according to claim 1, wherein said keyword display means provides a three-dimensional display of the keywords.

3. An information retrieval system according to claim 1, wherein the retrieved documents are displayed in a color different from a color used for displaying the keywords from the at least one user search query.

4. An information retrieval system according to claim 1, wherein said visualization display means further comprises means for viewing different aspects of the retrieved documents on the three-dimensional display.

5. An information retrieval system according to claim 1, wherein said visualization display means provides a list of retrieved documents, and wherein each retrieved document has an assigned score indicating relevance to the search query with respect to the other retrieved documents.

6. An information retrieval system according to claim 1, wherein a retrieved document mapped onto said display is selectable via said input interface, with the text of the selected document being displayed on said display.

7. An information retrieval system according to claim 1, further comprising fusing means for combining and ranking retrieved documents from all of said search engines.

8. An information retrieval system according to claim 1, wherein said means for viewing is interactively guided and selected by a user.

9. An information retrieval system according to claim 1, wherein each said search engine comprises a plurality of user selectable dictionaries for determining mathematical representations of documents.

10. An information retrieval system according to claim 1, wherein said input interface comprises relevance feedback means for accepting relevance feedback from the user.

11. An information retrieval system according to claim 10, wherein said relevance feedback means comprises means for selecting one or more retrieved documents as a next search query.

12. An information retrieval system according to claim 1, wherein said input interface comprises means for permitting a user to assign a weighting percentage to each search engine.

13. An information retrieval system according to claim 1, wherein the at least one user search query comprises at least one document.

14. An information retrieval system according to claim 1, wherein the at least one user search query comprises at least one document cluster.

15. A method for selectively retrieving documents from a document database using an information retrieval system comprising a plurality of search engines, the method comprising:

generating at least one user search query;

retrieving documents from the document database based upon the user search query, with each search engine searching the document database;

producing a common mathematical representation of each document retrieved by the respective search engines; and mapping respective mathematical representations of the retrieved documents onto a display, the mapping comprising displaying keywords from the at least one user input query, and displaying retrieved documents in clusters surrounding respective user search queries.

16. A method according to claim 15, wherein the mapping comprises mapping the mathematical representations onto a three dimensional display.

17. A method according to claim 15, wherein the displaying comprises displaying retrieved documents in a color different from a color used for displaying the keywords from the at least one user search query.

18. A method according to claim 15, wherein the displaying comprises displaying different aspects of the retrieved documents on the three-dimensional display.

19. A method according to claim 15, further comprising providing a list of retrieved documents, and wherein each retrieved document has an assigned score indicating relevance to the search query with respect to the other retrieved documents.

20. A method according to claim 15, further comprising:

receiving an input for selecting a retrieved document mapped onto the display; and displaying the text of the selected document on the display.

21. A method according to claim 15, further comprising combining and ranking retrieved documents from all of the search engines.

22. A method according to claim 15, further comprising providing relevance feedback means for accepting relevance feedback from a user.

23. A method according to claim 22, wherein providing the relevance feedback means comprises selecting one or more retrieved documents as a next search query.

24. A method according to claim 15, further comprising assigning a weighting percentage to each search engine.

25. A method according to claim 15, wherein the at least one user search query comprises at least one document.

26. A method according to claim 15, wherein the at least one user search query comprises at least one document cluster.

27. A method according to claim 18, wherein displaying the different aspects of the retrieved documents are interactively guided and selected by a user.

* * * * *

UNITED STATES PATENT AND TRADEMARK OFFICE
CERTIFICATE OF CORRECTION

PATENT NO. : 6,574,632 B2
DATED : June 3, 2003
INVENTOR(S) : Fox et al.

It is certified that error appears in the above-identified patent and that said Letters Patent is hereby corrected as shown below:

<u>Title page,</u>
Item [75], delete "Melbourne" insert -- West Melbourne --

<u>Column 1,</u>
Line 33, delete "Yahaoo" insert -- Yahoo --

<u>Column 3,</u>
Line 42, delete "relevance" insert -- relevant --

<u>Column 7,</u>
Line 53, delete "p(i) =" insert -- p(t) = --

<u>Column 8,</u>
Line 33, delete "$\|\epsilon\|_2=\|\epsilon\|=1$" insert -- $\|\omega\|_2=\|\omega\|=1$ --

<u>Column 9,</u>
Line 50, delete "$\lambda_w$" insert -- $\mu_w$ --

<u>Column 13,</u>
Line 31, delete "interes" insert -- interest --
Lines 32 and 34, delete "standar" insert -- standard --
Line 37, delete "nex larges" insert -- next largest --

<u>Column 15,</u>
Line 51, delete "many" insert -- may --

UNITED STATES PATENT AND TRADEMARK OFFICE
CERTIFICATE OF CORRECTION

PATENT NO.     : 6,574,632 B2
DATED          : June 3, 2003
INVENTOR(S)    : Fox et al.

It is certified that error appears in the above-identified patent and that said Letters Patent is hereby corrected as shown below:

Column 16,
Line 62, delete "indicated" insert -- indicate --

Signed and Sealed this

Thirtieth Day of September, 2003

JAMES E. ROGAN
*Director of the United States Patent and Trademark Office*